United States Patent
Ishikawa et al.

(10) Patent No.: US 8,823,236 B2
(45) Date of Patent: Sep. 2, 2014

(54) STATOR WINDING FOR ROTATING ELECTRIC MACHINE

(75) Inventors: Toshio Ishikawa, Hitachinaka (JP); Yasuhiko Kimura, Hitachinaka (JP); Yoshimi Mori, Mito (JP); Masahiko Honma, Hitachiota (JP); Yosuke Umesaki, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 65 days.

(21) Appl. No.: 13/513,389

(22) PCT Filed: Aug. 11, 2010

(86) PCT No.: PCT/JP2010/063668
§ 371 (c)(1),
(2), (4) Date: Jun. 25, 2012

(87) PCT Pub. No.: WO2011/089749
PCT Pub. Date: Jul. 28, 2011

(65) Prior Publication Data
US 2012/0274171 A1 Nov. 1, 2012

(30) Foreign Application Priority Data
Jan. 22, 2010 (JP) .................... 2010-012466

(51) Int. Cl.
*H02K 3/28* (2006.01)
*H02K 3/18* (2006.01)
*H02K 3/04* (2006.01)

(52) U.S. Cl.
USPC ........................... 310/198; 310/195; 310/215

(58) Field of Classification Search
CPC ............. H02K 2/28; H02K 3/12; H02K 3/48; H02K 3/345; H02K 3/20

USPC .................. 310/207, 208, 205, 215, 195, 179
See application file for complete search history.

(56) References Cited

U.S. PATENT DOCUMENTS 5,113,573 A * 5/1992 Taji et al. ........................ 29/596
6,873,082 B2 * 3/2005 Neet .............................. 310/215

(Continued)

FOREIGN PATENT DOCUMENTS

| JP | 2000-232745 A | 8/2000 |
|----|---------------|--------|
| JP | 2007-97247 A  | 4/2007 |
| JP | 2007-143360 A | 6/2007 |
| JP | 2009-72034 A  | 4/2009 |

(Continued)

OTHER PUBLICATIONS

International Search Report with English translation dated Nov. 16, 2010 (five (5) pages).

(Continued)

*Primary Examiner* — Terrance Kenerly
(74) *Attorney, Agent, or Firm* — Crowell & Moring LLP

(57) ABSTRACT

An object is to provide a rotating electric machine offering a high output and high efficiency by balancing inductance of each phase even if a stator is used in which stator windings of different phases are disposed in a slot of a stator core in a three-phase winding. A stator 5 includes a stator core 6 having a plurality of slots arrayed circumferentially and opening to an inner peripheral surface and a stator winding 7 wound in each of the slots. The stator winding 7 is divided into at least two for each phase (7U-A, 7U-B, 7V-A, 7V-B, 7W-A, 7W-B). After insertion of the stator core 6, the stator winding of each phase is connected in parallel or in series. The stator winding of each phase is disposed in slots such that combined inductance of different phases is equalized.

9 Claims, 23 Drawing Sheets

(56) References Cited

U.S. PATENT DOCUMENTS

| | | |
|---|---|---|
| 2005/0206263 A1* | 9/2005 | Cai et al. ............... 310/198 |
| 2007/0114871 A1 | 5/2007 | Imai et al. |
| 2009/0230806 A1 | 9/2009 | Miyata et al. |
| 2011/0095641 A1* | 4/2011 | Rhoads ................. 310/215 |
| 2012/0181891 A1* | 7/2012 | Yamada et al. ........ 310/201 |
| 2012/0319523 A1* | 12/2012 | Manabu et al. ........ 310/201 |

FOREIGN PATENT DOCUMENTS

| | | |
|---|---|---|
| JP | 2009-165318 A | 7/2009 |
| JP | 2009-247196 A | 10/2009 |
| WO | WO 00/48292 A1 | 8/2000 |

OTHER PUBLICATIONS

Form PCT/ISA/237 (four (4) pages).

* cited by examiner

STATOR WINDING FOR ROTATING ELECTRIC MACHINE

TECHNICAL FIELD

The present invention relates to a rotating electric machine.

BACKGROUND ART

With recent trends toward more environmental regulations and energy consciousness on the part of end users, vehicular rotating electric machines are being required to offer high output and high efficiency and improvements are proposed on stators that produce a particularly great effect.

In general, a stator used in a rotating electric machine includes a stator core and a stator winding. The stator core has a plurality of slots arrayed circumferentially and opening in an inner peripheral surface. The stator winding is formed of a continuous wire into a wave. A winding pitch of an annular coil used for the stator winding is a full-pitch winding and the stator winding is inserted in each slot across a plurality of teeth. A rotor includes a pair of rotor cores having claw-shaped magnetic poles that are disposed such that claw portions face each other and one claw-shaped magnetic pole engages with another.

A known technique incorporates a fractional-pitch winding for the winding pitch of the annular coil used for the stator winding, thereby adopting a winding style of an array of a plurality of annular coils, instead of the conventional wave winding. The technique thereby provides a low-cost, high output, and high efficiency rotating electric machine with reduced resistance achieved by a shorter coil length (see Patent Document 1).

PRIOR ART DOCUMENTS

Patent Document

Patent Document 1: JP-2009-247196-A

SUMMARY OF THE INVENTION

Problem to be Solved by the Invention

In Patent Document 1, when a stator winding formed of a continuous wire is to be formed, coils of different phases are disposed in the same slot and the coils of different phases are disposed separately in an inner layer and an outer layer. Because of each phase being disposed in a biased condition, imbalance occurs in inductance of each phase within the three-phase winding.

An object of the present invention is to provide a rotating electric machine offering a high output and high efficiency by balancing inductance of each phase even if a stator is used in which stator windings of different phases are disposed in a slot of a stator core in a three-phase winding.

Means for Solving the Problem

To solve the foregoing problem, one preferable aspect of the present invention provides a rotating electric machine that includes a stator and a rotor rotatably supported on an inner peripheral side of the stator via a gap. The stator includes an annular stator core having a plurality of slots that open to an inner peripheral surface and a stator winding wound via an insulating sheet in the slots. The stator has coils of different phases disposed in the slots. In the rotating electric machine, the stator winding is divided into at least two for each phase in the slot so as to balance inductance.

Effect of the Invention

In the present invention, a rotating electric machine can be provided that offers a high output and high efficiency by balancing inductance of each phase even if a stator is used in which stator windings of different phases are disposed in a slot of a stator core in a three-phase winding.

MODES FOR CARRYING OUT THE INVENTION

Arrangements of a rotating electric machine according to a first embodiment will be described below with reference to FIGS. 1 to 10.

A general arrangement of the rotating electric machine according to the first embodiment will be first described with reference to FIG. 1. An AC generator for vehicles will here be exemplarily described as the rotating electric machine.

Figure 1:
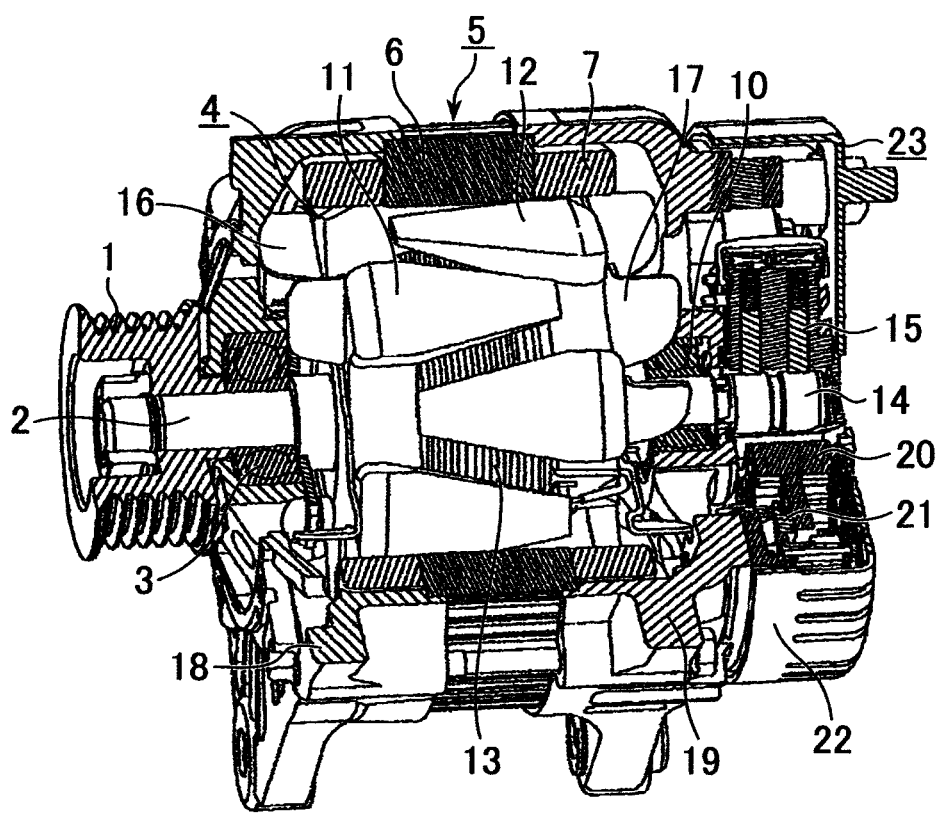
FIG. 1 is a cross-sectional view showing a general arrangement of a rotating electric machine according to a first embodiment.

FIG. 1 is a cross-sectional view showing the general arrangement of the rotating electric machine according to the first embodiment.

A vehicular AC generator 23 includes a rotor 4 and a stator 5. The rotor 4 includes a field winding 13 at a central portion of a shaft 2 and a rotor core disposed on both sides of the field winding 13 so as to sandwich and cover the field winding 13 from both sides. The rotor core includes a front-side claw-shaped magnetic pole 11 and a rear-side claw-shaped magnetic pole 12 formed of a magnetic material. The front-side claw-shaped magnetic pole 11 and the rear-side claw-shaped magnetic pole 12 are disposed such that claw portions thereof face each other and a claw-shaped magnetic pole on a first side engages with a claw-shaped magnetic pole on a second side.

The rotor 4 is disposed to face the stator 5 on an inner peripheral side of the stator 5 with a small gap therebetween. The rotor 4 has the shaft 2 passed through inner races of a front bearing 3 and a rear bearing 10 and is thus rotatably supported.

The stator 5 includes a stator core 6 and a stator winding 7. The stator core 6 includes a plurality of laminations of thin steel sheets formed annularly. The laminations have protruding teeth portions (teeth) on an inner peripheral side thereof and a slot formed between each pair of the teeth portions. The stator winding 7 of each phase is mounted by being inserted into a corresponding slot across a plurality of teeth. The stator 5 has both ends thereof held in position by a front bracket 18 and a rear bracket 19.

A pulley 1 is mounted on a first end portion of the shaft 2. A slip ring 14 is disposed on a second end portion of the shaft 2. The slip ring 14 contacts a brush 15 to thereby supply the field winding 13 with electricity. In addition, a front fan 16 and a rear fan 17 serving as cooling fans are disposed on either end face of the front-side claw-shaped magnetic pole 11 and the rear-side claw-shaped magnetic pole 12 of the rotor 4. A centrifugal force generated through rotation creates an air flow, with air drawn in from outside and air used for cooling the inside discharged to outside.

The stator winding 7 is formed in a three-phase winding in this example. A lead of each winding is connected to a rectifying circuit 20. The rectifying circuit 20 includes a rectifying device, such as a diode, to form a full-wave rectifying circuit. For the diode, for example, a cathode terminal is connected to a diode connecting terminal 21. An anode terminal is electrically connected to a vehicular AC generator main unit. A rear cover 22 serves as a protective cover for the rectifying circuit 20.

Electricity generating operation will be described below.

With an engine started, rotation is transmitted from a crankshaft to the pulley 1 via a belt, so that the rotor 4 is rotated via the shaft 2. When a direct current is supplied from the brush 15 to the field winding 13 disposed in the rotor 4 via the slip ring 14, magnetic flux is produced extending around inner and outer peripheries of the field winding 13. This alternately forms an N-pole or an S-pole circumferentially in the front-side claw-shaped magnetic pole 11 and the rear-side claw-shaped magnetic pole 12 in the rotor 4. The magnetic flux produced by the field winding 13 emerges from the N-pole of the front-side claw-shaped magnetic pole 11, extends through the stator core 6 to go around the stator winding 7, and reaches the S-pole of the rear-side claw-shaped magnetic pole 12 of the rotor 4. This forms a magnetic circuit that circulates through the rotor 4 and the stator 5. As such, the magnetic flux produced in the rotor interlinks with the stator winding 7, which generates an AC induced voltage in each of U-phase, V-phase, and W-phase stator windings 7. A three-phase AC induced voltage is thereby generated as a whole.

The AC voltage thus generated is then subjected to full-wave rectification and smoothing by the rectifying circuit 20 formed of a rectifying device, such as a diode, and converted to a corresponding DC voltage. Current supplied to the field winding 13 is controlled by an IC regulator (not shown) so that the smoothed DC voltage is a constant voltage.

Figure 2:
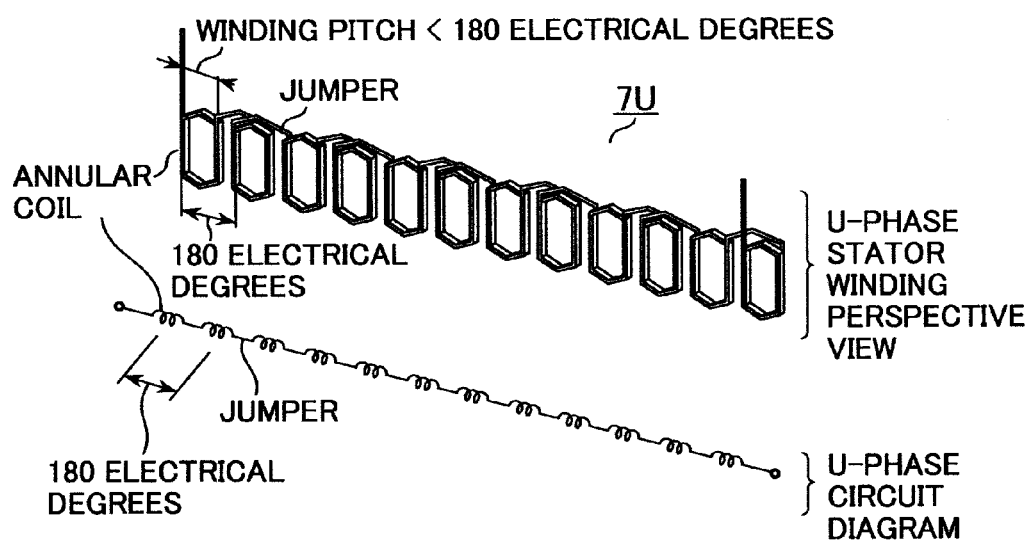
FIG. 2 is a perspective view and a circuit diagram showing a U-phase stator winding of a related-art stator wound by fractional-pitch winding.
Figure 3:
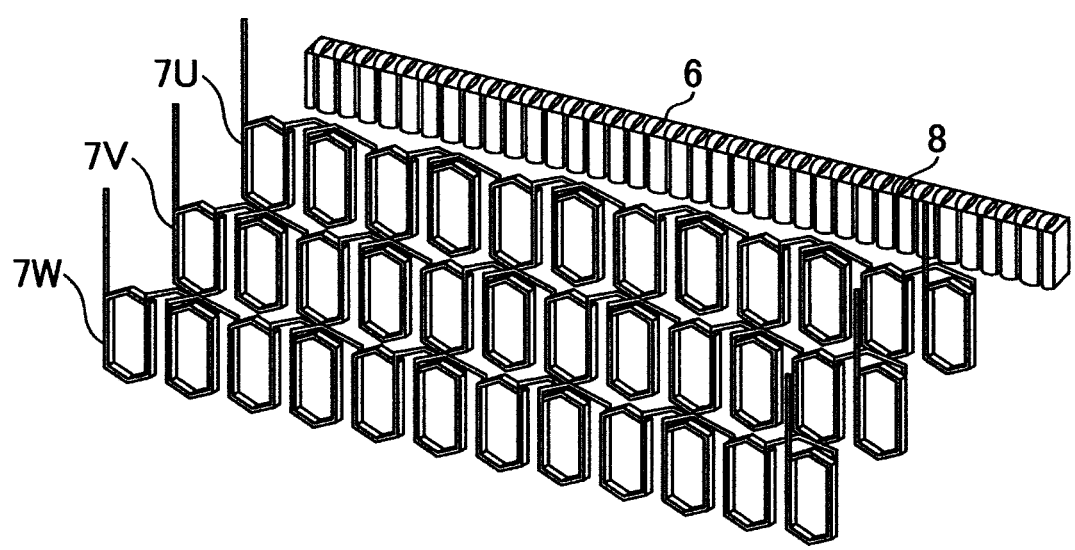
FIG. 3 is an exploded view showing the related-art stator wound by fractional-pitch winding, developed along a straight line.
Figure 4:
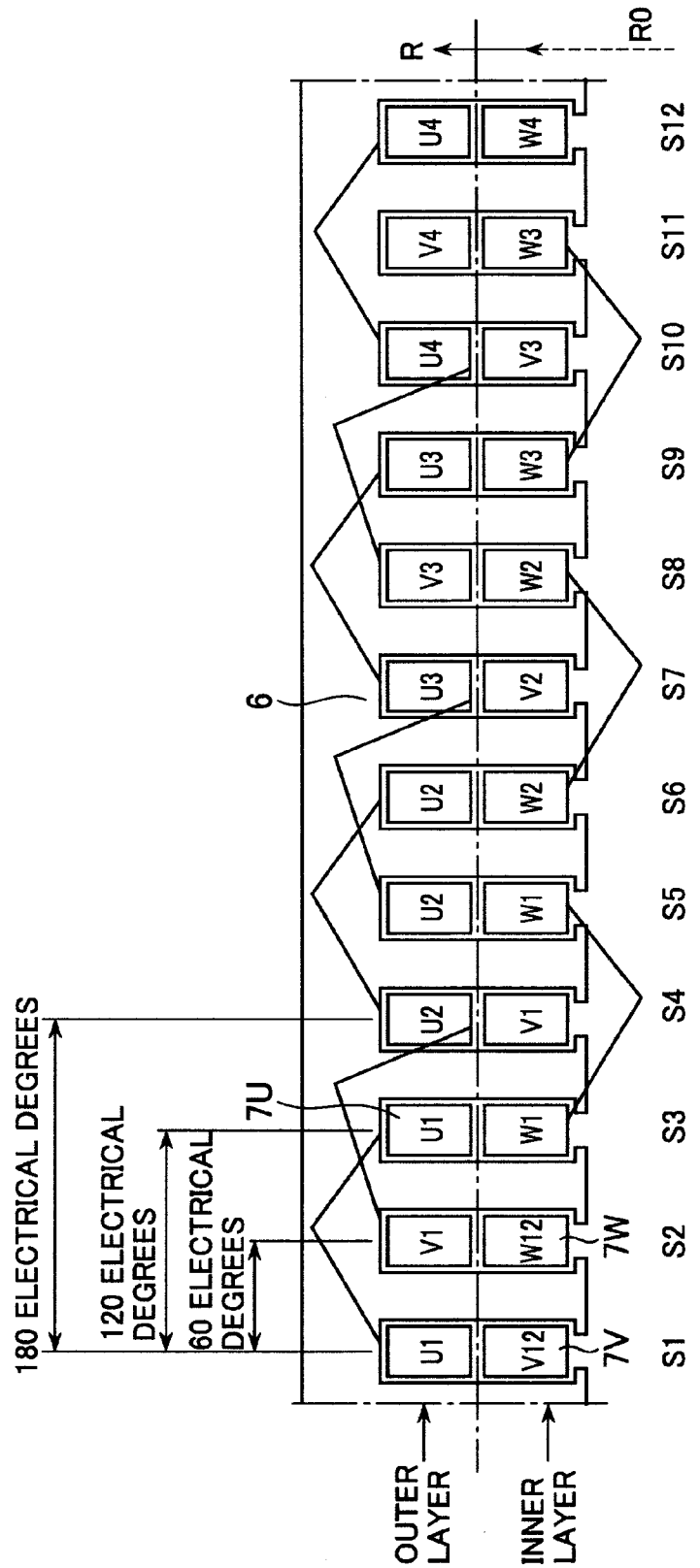
FIG. 4 is an arrangement view showing coils of different phases in slots of the related-art stator wound by fractional-pitch winding.

Arrangements of a related-art stator wound by fractional-pitch winding are shown in FIGS. 2 to 4.

FIG. 2 is a perspective view and a circuit diagram showing a U-phase stator winding of the related-art stator wound by the fractional-pitch winding. FIG. 3 is an exploded view showing the related-art stator wound by the fractional-pitch winding, developed along a straight line. FIG. 4 is an arrangement view showing coils of different phases in slots of the related-art stator wound by the fractional-pitch winding.

The fractional-pitch winding refers to a type of winding in which the winding pitch of the annular coil used for the stator winding is an electrical angle of less than 180° and which is inserted in each slot across a plurality of teeth. It is noted that a type of winding in which the winding pitch of the annular coil used for the stator winding is an electrical angle of 180° (equal to a magnetic pole pitch) and which is inserted in each slot across a plurality of teeth is referred to as full-pitch winding.

Referring to FIG. 2, the stator winding 7 includes a plurality of annularly wound and formed coils connected together with jumpers. With the exemplary 12-pole three-phase winding, the number of annular coils is 12, each being connected to each other with a jumper, formed continuously. The number of turns of the annular coil is, for example, 4 turns (turn will hereinafter be represented by T).

It is noted that the number of slots in the stator core is 36. Additionally, in this case, the front-side claw-shaped magnetic pole 11 of the rotor shown in FIG. 1 has six claw portions and the rear-side claw-shaped magnetic pole 12 has also six claw portions. Specifically, there are 12 poles.

Referring to FIG. 2, for a U-phase stator winding 7U, the annular coils are disposed at a pitch of 180 electrical degrees that equals the magnetic pole pitch and the winding pitch of the annular coils is the fractional-pitch winding.

The same configuration applies also to a V-phase stator winding and a W-phase stator winding.

Referring to FIG. 3, a formed stator winding 7 has the U-phase stator winding 7U, a V-phase stator winding 7V, and a W-phase stator winding 7W inserted in sequence in respective slots and disposed, as shown in FIG. 4, in sequence in the respective slots. Assuming that the number of poles of the rotor is 12 and the number of slots in the stator is 36, a pitch between a first slot S1 and a fourth slot S4 is 180 electrical degrees.

The stator winding 7 wound by the fractional-pitch winding has a double-layer winding arrangement in which the winding is divided into two radial layers of the slot, one on the side of a slot opening portion being an inner layer and the other on the side of the stator core 6 being an outer layer.

Annular coils designated by an identical reference numeral in FIG. 4, for example, two U-phase annular coils U1 indicate the annularly formed coils shown in FIG. 2. The annularly formed coil includes two linear slot inserting portions and two coil end portions, each connecting ends of the two slot inserting portions. The two U-phase annular coils U1 shown in FIG. 4 represent respective slot inserting portions of one annularly formed coil. The both ends of each of the two slot inserting portions are connected together by the respective two coil end portions in portions outside respective ends of the slot. The slot inserting portions of a first annular coil U1 are inserted in the first slot S1 and a third slot S3 across one slot S2 interposed therebetween. A second U-phase annular coil U2 is inserted in a fourth slot S4 adjacent the slot S3 in which the first U-phase annular coil U1 is inserted and in a sixth slot S6 across one slot S5 interposed therebetween. It is noted that the first U-phase annular coil U1 and the second U-phase annular coil U2 are connected together by a jumper as shown in FIG. 2. Specifically, the U-phase annular coil 7U has an annular coil pitch at 180 electrical degrees that is equal to a magnetic pole pitch and incorporates the fractional-pitch winding for the winding pitch of the annular coil at 120 electrical degrees.

Similarly, a third U-phase annular coil U3 is inserted in a seventh slot S7 and a ninth slot S9 and a fourth U-phase annular coil U4 is inserted in a tenth slot S10 and a 12th slot S12. Though FIG. 4 shows arrangements for 12 slots (⅓ of the total 36 slots), the same arrangements are repeated for remaining fifth to 12th annular coils.

All U-phase stator windings are inserted in the slots on the outer layer side.

The V-phase stator winding 7V will be described below. The slot inserting portions of a first annular coil V1 are inserted in an outer layer of the second slot S2 and an inner layer of the fourth slot S4 across one slot S3 interposed therebetween. A second V-phase annular coil V2 is inserted in an outer layer of the fifth slot S5 adjacent the slot S4 in which the first V-phase annular coil V1 is inserted and in an inner layer of the seventh slot S7 across one slot S6 interposed therebetween. Similarly, a third V-phase annular coil V3 is inserted in an outer layer of an eighth slot S8 and an inner layer of a tenth slot S10. A fourth V-phase annular coil V4 is inserted in inner layers of an 11th slot S11 and of a 13th slot not shown. In addition, a 12th V-phase annular coil V12 is inserted in an inner layer of the first slot S1. Though FIG. 4 shows arrangements for 12 slots (⅓ of the total 36 slots), the same arrangements are repeated for remaining fifth to 12th annular coils.

The W-phase stator winding 7W will be described below. The slot inserting portions of a first annular coil W1 are inserted in inner layers of the third slot S3 and of the fifth slot S5 across one slot S4 interposed therebetween. A second W-phase annular coil W2 is inserted in inner layers of the sixth slot S6 adjacent the slot S5 in which the first W-phase annular coil W1 is inserted and of the eighth slot S8 across one slot S7 interposed therebetween. Similarly, a third W-phase annular coil W3 is inserted in inner layers of the ninth slot S9 and of the 11th slot S11. A fourth W-phase annular coil W4 is inserted in inner layers of the 12th slot S12 and of a 14th slot not shown. In addition, a 12th W-phase annular coil W12 is inserted in an inner layer of the second slot S2. Though FIG. 4 shows arrangements for 12 slots (⅓ of the total 36 slots), the same arrangements are repeated for remaining fifth to 12th annular coils.

All W-phase stator windings are inserted in the slots on the inner layer side.

According to the arrangements of the stator winding 7, the U-phase stator winding 7U is disposed on the outer layer, the V-phase stator winding 7V is disposed on the inner and outer layers, and the W-phase stator winding 7W is disposed on the inner layer, being unevenly disposed relative to the stator core 6. Slot leakage inductance is directly proportional to the radial direction of the slot. Referring to FIG. 4, the leakage inductance increases continuously from the slot opening portion toward the outer peripheral side.

For example, let R0 be a distance between a center of the rotor and a central position of the inner layer coil in a radial direction in the slot and let R0+R be a central position of the outer layer coil in the radial direction with reference to the radial central position of the inner layer coil. All four U-phase annular coils shown are inserted in the outer layer, so that the total radial distance is represented by 8R0+8R (=4×(2R0+2R)). The V-phase coils are inserted in the outer and inner layers, so that the total radial distance is represented by 8R0+4R (=4×(R0+R+R0+0)). In addition, all four W-phase coils shown are inserted in the inner layer, so that the total radial distance is represented by 8R0 (=4×(R0+0)).

With reference to the W-phase stator winding, the U-phase is higher than W-phase by 8R and the V-phase is higher than the W-phase by 4R over a range of ⅓ of the total number of slots in FIG. 4. As a result, the W-phase stator winding 7W disposed on the inner layer of the slot has low inductance, while the U-phase stator winding 7U disposed on the outer layer of the slot has high inductance, which produces imbalance because of different inductance levels among the stator windings of different phases.

The imbalance in inductance among different phases results in varying current values generated by the different phases, so that the stator windings and the diode generate different amounts of heat. Then, for example, increased magnetic noise due to increased temperatures of the coils and the diode or an increased magnetic exciting force degrade quality and characteristics.

In a delta connection, a circulating current that flows through the connection increases and copper loss of the stator windings is consumed, resulting in a reduced power generating efficiency.

Arrangements of the stator of the rotating electric machine according to this embodiment will be described below with reference to FIGS. 5 to 12.

Figure 5:
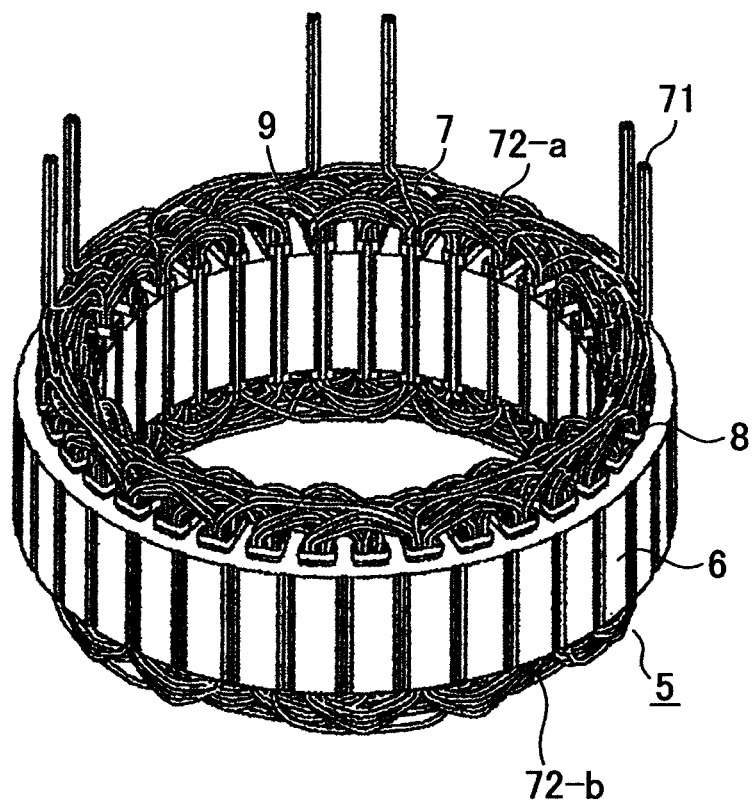
FIG. 5 is a perspective view showing a stator of the rotating electric machine according to the first embodiment.
Figure 6:
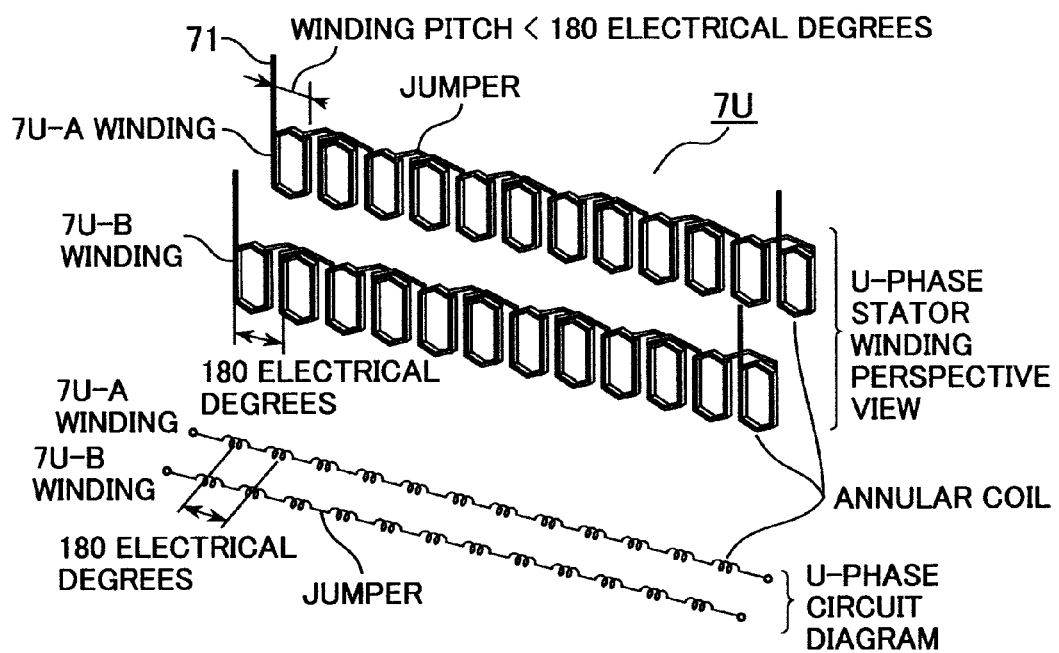
FIG. 6 is a perspective view and a circuit diagram showing a U-phase stator winding in the stator of the rotating electric machine according to the first embodiment, wound by fractional-pitch winding.
Figure 7:
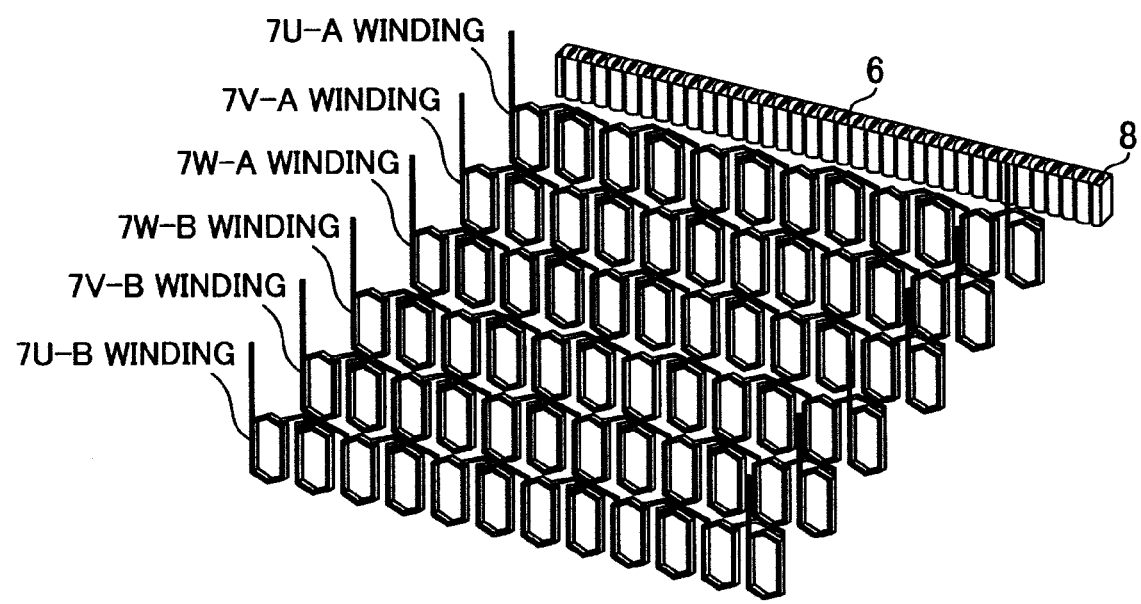
FIG. 7 is an exploded view showing the stator of the rotating electric machine according to the first embodiment wound by fractional-pitch winding, developed along a straight line.
Figure 8:
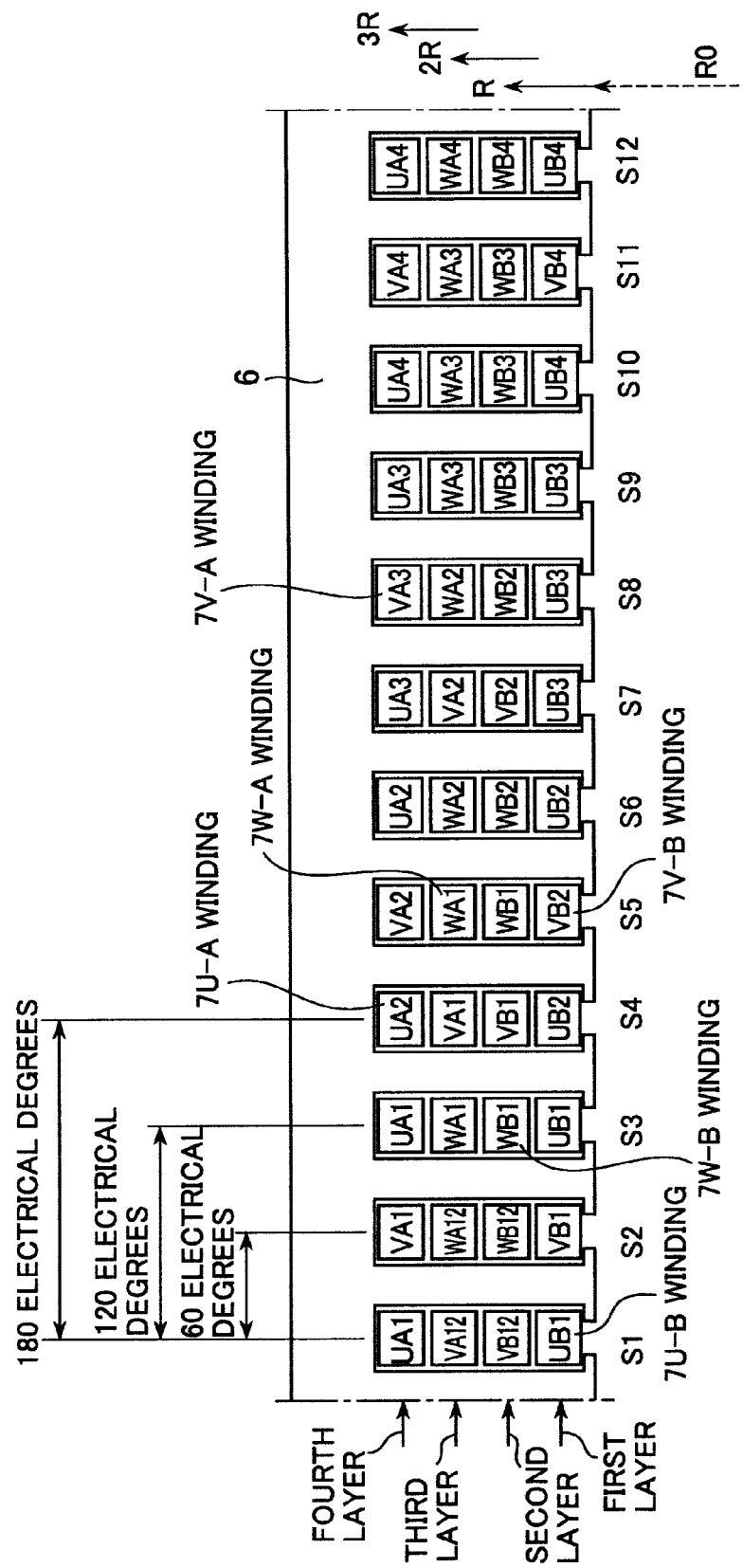
FIG. 8 is an arrangement view showing coils of different phases in slots of the stator of the rotating electric machine according to the first embodiment wound by fractional-pitch winding.

FIG. 5 is a perspective view showing the stator of the rotating electric machine according to the first embodiment. FIG. 6 is a perspective view and a circuit diagram showing the U-phase stator winding in the stator of the rotating electric machine according to the first embodiment, wound by the fractional-pitch winding. FIG. 7 is an exploded view showing the stator of the rotating electric machine according to the first embodiment wound by the fractional-pitch winding, developed along a straight line. FIG. 8 is an arrangement view showing coils of different phases in slots of the stator of the rotating electric machine according to the first embodiment wound by the fractional-pitch winding. FIGS. 9 to 12 are connection diagrams, each showing the three-phase wiring in the stator of the rotating electric machine according to the first embodiment.

Referring to FIG. 5, the stator 5 includes the annular stator core 6 and a slot wedge 9. Specifically, the stator core 6 has a plurality of slots in a circumferential direction in an inner peripheral surface thereof. The slot wedge 9 is disposed on an innermost side of the slot. The slot wedge 9 holds, in the slot, the stator winding 7 of each phase mounted via U-shaped insulating paper 8 disposed on an inner peripheral surface of each slot. In the example, there are 36 slots.

Portions outside the slot of the stator core 6 are coil ends 72-a, 72-b extending across two slots. In addition, there are 12 leads 71 as shown in the figure. This is because, as will be later described with reference to FIG. 6, each of the U-phase, V-phase, and W-phase stator windings is divided into two.

Specific examples of the stator windings according to this embodiment will be described below with reference to FIGS. 6 to 8. In this embodiment, the relationship between the leakage inductance and the coil position in the radial direction in the slot is used in the stator 5 having coils of different phases mixed with each other in the same slot of the stator core 6. Specifically, the stator winding 7 of each phase is evenly divided, disposed in the slot such that a value of totaling all distances for each phase, each distance being from the center of the stator core to the coil inserted in the slot, is the same for all phases, and connected in series or parallel with each other. Inductance is thereby combined to achieve balance.

Referring to FIG. 6, the U-phase winding 7 of the stator winding 7 includes a first U-phase winding 7U-A and a second U-phase winding 7U-B. Each of the U-phase windings 7U-A, 7U-B includes a plurality of annularly wound and formed coils connected with jumpers. With the 12-pole three-phase winding here exemplified, the number of annular coils is 12 and the 12 annular coils are continuously connected together by the jumpers. The circuit diagram of the first U-phase winding 7U-A and the second U-phase winding 7U-B of the U-phase winding 7U shown on the upper side of FIG. 6 is shown on the lower side of FIG. 6.

The number of slots in the stator core is 36. At this time, the front-side claw-shaped magnetic pole 11 of the rotor has six claw portions and the rear-side claw-shaped magnetic pole 12 also has six claw portions. Specifically, the rotor has 12 poles.

Referring to FIG. 6, each of the U-phase winding 7U-A and the U-phase winding 7U-B includes annular coils disposed at a pitch of 180 electrical degrees that is equal to the magnetic pole pitch and the winding pitch of the annular coils is the fractional-pitch winding.

To obtain an output equivalent to that of the related-art stator winding wound by the fractional-pitch winding as shown in FIG. 4, each of the U-phase winding 7U-A and the U-phase winding 7U-B has the number of turns of, for example, 4T, but has a wire size with a cross-sectional area equivalent to ½ relative to that of the example shown in FIG. 4.

The V-phase stator winding 7V and the W-phase stator winding 7W each are divided into two in the same manner as with the U-phase stator winding 7U, having a first V-phase winding 7V-A, a second V-phase winding 7V-B, a first W-phase winding 7W-A, and a second W-phase winding 7W-B, respectively.

The stator windings 7 divided into two are inserted in the slot in sequence in the following order, specifically, as shown in FIG. 7, the first U-phase winding 7U-A, the first V-phase winding 7V-A, the first W-phase winding 7W-A, the second W-phase winding 7W-B, the second V-phase winding 7V-B, and the second U-phase winding 7U-B and disposed in sequence in the slot as shown in FIG. 8.

Figure 9:
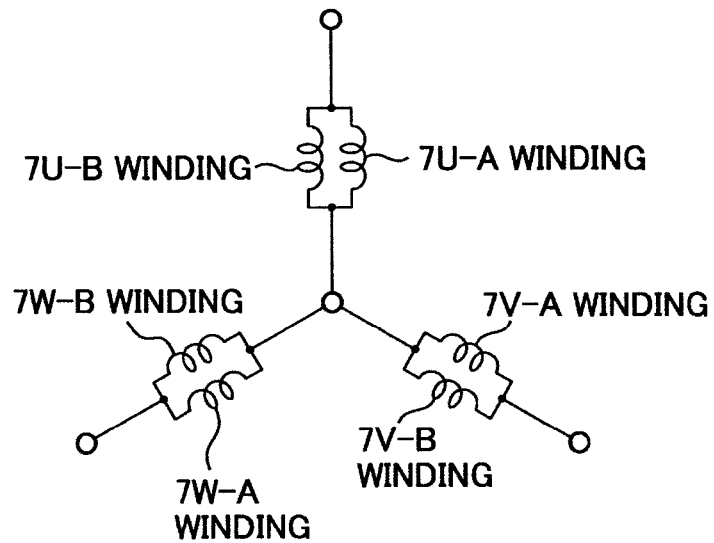
FIG. 9 is a connection diagram showing a three-phase wiring in the stator of the rotating electric machine according to the first embodiment.
Figure 10:
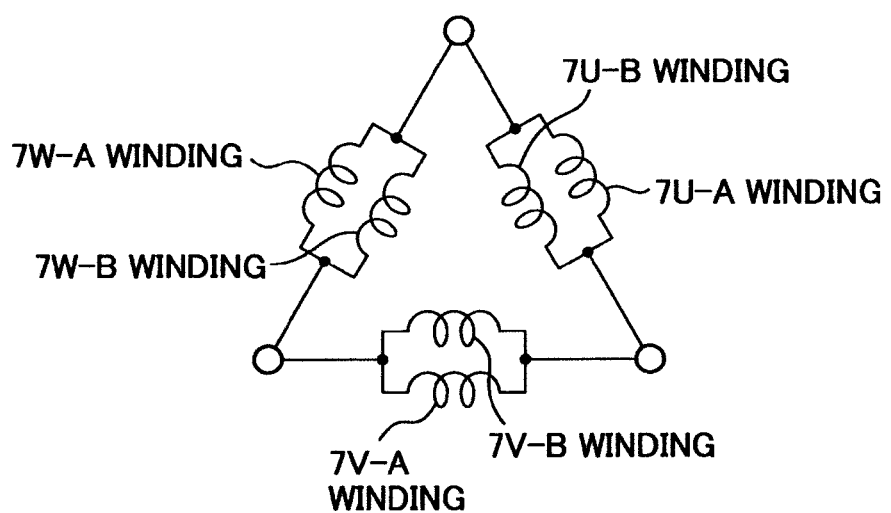
FIG. 10 is a connection diagram showing a three-phase wiring in the stator of the rotating electric machine according to the first embodiment.

Referring to FIG. 8, coils are disposed in the slot in the stator winding 7 as a four-layer winding in which the coils are radially divided into four groups. Let a first layer be an innermost side of the slots and a fourth layer be an outermost side thereof. Then, the first and fourth layers are of the same phase and the second and third layers are of the same phase. Then, the phases are connected in parallel with each other as shown in FIG. 9 or 10, which combines inductance and the inductance of each phase is equalized, so that balance is achieved in generated currents.

Referring to FIG. 8, the first phase windings 7U-A, 7V-A, 7W-A and the second phase windings 7W-B, 7V-B, 7U-B are axisymmetrically inserted with reference to a line between the second and third layers. Specifically, whereas the first U-phase winding 7U-A is inserted in the fourth layer, the second U-phase winding 7U-B is inserted in the first layer. Whereas the first V-phase winding 7V-A is inserted in the fourth and third layers, the second V-phase winding 7V-B is inserted in the first and second layers. In addition, whereas the first W-phase winding 7W-A is inserted in the third layer, the second W-phase winding 7W-B is inserted in the second layer.

Order of insertion of each phase winding will be specifically described below with reference to FIG. 8.

Annular coils designated by an identical reference numeral in FIG. 8, for example, two first U-phase annular coils UA1 indicate the annularly formed coils shown in FIG. 7. The annularly formed coil includes two linear slot inserting portions and two coil end portions, each connecting ends of the two slot inserting portions. The two first U-phase annular coils UA1 shown in FIG. 8 represent respective slot inserting portions of one annularly formed coil. The both ends of each of the two slot inserting portions are connected together by the respective two coil end portions in portions outside respective ends of the slot. The first U-phase annular coil UA1 is inserted in the fourth layer of the slot. The slot inserting portions of a first U-phase first annular coil UA1 are inserted in a first slot S1 and a third slot S3 across one slot S2 interposed therebetween. A first U-phase second annular coil UA2 is inserted in a fourth slot S4 adjacent the slot S3 in which the first U-phase first annular coil UA1 is inserted and in a sixth slot S6 across one slot S5 interposed therebetween. It is noted that the first U-phase first annular coil UA1 and the first U-phase second annular coil UA2 are connected together by a jumper as shown in FIG. 6. Specifically, the first U-phase stator winding 7U-A has an annular coil pitch at 180 electrical degrees that is equal to a magnetic pole pitch and incorporates the fractional-pitch winding for the winding pitch of the annular coil at 120 electrical degrees.

Similarly, a first U-phase third annular coil UA3 is inserted in a seventh slot S7 and a ninth slot S9. A first U-phase fourth annular coil UA4 is inserted in a tenth slot S10 and a 12th slot S12. FIG. 8 shows arrangements for 12 slots (⅓ of the total 36 slots) and the same arrangements are repeated for remaining fifth to 12th annular coils.

All first U-phase stator windings 7U-A are inserted in the slots on the fourth layer side.

The first V-phase stator winding 7V-A will be described below. The slot inserting portions of a first V-phase first annular coil VA1 are inserted in the fourth layer of a second slot S2 and the third layer of the fourth slot S4 across one slot S3 interposed therebetween. A first V-phase second annular coil VA2 is inserted in the fourth layer of a fifth slot S5 adjacent the slot S4 in which the first V-phase first annular coil VA1 is inserted and in the third layer of the seventh slot S7 across one slot S6 interposed therebetween. It is noted that the first V-phase first annular coil VA1 and the first V-phase second annular coil VA2 are connected together by a jumper as shown in FIG. 6. Specifically, the first V-phase stator winding 7V-A has an annular coil pitch at 180 electrical degrees that is equal to a magnetic pole pitch and incorporates the fractional-pitch winding for the winding pitch of the annular coil at 120 electrical degrees.

Similarly, a first V-phase third annular coil VA3 is inserted in the fourth layer of an eighth slot S8 and the third layer of the tenth slot S10. A first V-phase fourth annular coil VA4 is inserted in the fourth layer of an 11th slot S11 and the third layer of a 13th slot not shown. In addition, a first V-phase 12th annular coil VA12 is inserted in the third layer of the first slot S1. Though FIG. 8 shows arrangements for 12 slots (⅓ of the total 36 slots), the same arrangements are repeated for remaining fifth to 12th annular coils.

All first V-phase stator windings 7V-A are inserted in the slots on the fourth and third layer sides.

The first W-phase stator winding 7W-A will be described below. The slot inserting portions of a first W-phase first annular coil WA1 are inserted in the third layers of the third slot S3 and of the fifth slot S5 across one slot S4 interposed therebetween. A first W-phase second annular coil WA2 is inserted in the sixth slot S6 adjacent the slot S5 in which the first W-phase first annular coil WA1 is inserted and the eighth slot S8 across one slot S7 interposed therebetween. It is noted that the first W-phase first annular coil WA1 and the first W-phase second annular coil WA2 are connected together by a jumper as shown in FIG. 6. Specifically, the first W-phase stator winding 7W-A has an annular coil pitch at 180 electrical degrees that is equal to a magnetic pole pitch and incorporates the fractional-pitch winding for the winding pitch of the annular coil at 120 electrical degrees.

Similarly, a first W-phase third annular coil WA3 is inserted in the third layers of the ninth slot S9 and of the 11th slot S11. A first W-phase fourth annular coil WA4 is inserted in the third layers of the 12th slot S12 and of a 14th slot not shown. In addition, a first W-phase 12th annular coil WA12 is inserted in the third layer of the second slot S2. Though FIG. 8 shows arrangements for 12 slots (⅓ of the total 36 slots), the same arrangements are repeated for remaining fifth to 12th annular coils.

All first W-phase stator windings 7W-A are inserted in the slots on the third layer side.

The second W-phase stator winding 7W-B will be described below. The slot inserting portions of a second W-phase first annular coil WB1 are inserted in the second layers of the third slot S3 and of the fifth slot S5 across one slot S4 interposed therebetween. A second W-phase second annular coil WB2 is inserted in the second layers of the sixth slot S6 adjacent the slot S5 in which the second W-phase first annular coil WB1 is inserted and of the eighth slot S8 across one slot S7 interposed therebetween. It is noted that the second W-phase first annular coil WB1 and the second W-phase second annular coil WB2 are connected together by a jumper as shown in FIG. 6. Specifically, the second W-phase stator winding 7W-B has an annular coil pitch at 180 electrical degrees that is equal to a magnetic pole pitch and incorporates the fractional-pitch winding for the winding pitch of the annular coil at 120 electrical degrees.

Similarly, a second W-phase third annular coil WB3 is inserted in the second layers of the ninth slot S9 and of the 11th slot S11. A second W-phase fourth annular coil WB4 is inserted in the second layers of the 12th slot S12 and of a 14th slot not shown. In addition, a second W-phase 12th annular coil WB12 is inserted in the third layer of the second slot S2. Though FIG. 8 shows arrangements for 12 slots (⅓ of the total 36 slots), the same arrangements are repeated for remaining fifth to 12th annular coils.

All second W-phase stator windings 7W-B are inserted in the slots on the second layer side.

The second V-phase stator winding 7V-B will be described below. The slot inserting portions of a second V-phase first annular coil VB1 are inserted in the first layer of the second slot S2 and the second layer of the fourth slot S4 across one slot S3 interposed therebetween. A second V-phase second annular coil VB2 is inserted in the first layer of the fifth slot S5 adjacent the slot S4 in which the second V-phase first annular coil VB1 is inserted and the second layer of the seventh slot S7 across one slot S6 interposed therebetween. It is noted that the second V-phase first annular coil VB1 and the second V-phase second annular coil VB2 are connected together by a jumper as shown in FIG. 6. Specifically, the second V-phase stator winding 7V-B has an annular coil pitch at 180 electrical degrees that is equal to a magnetic pole pitch and incorporates the fractional-pitch winding for the winding pitch of the annular coil at 120 electrical degrees.

Similarly, a second V-phase third annular coil VB3 is inserted in the first layer of the eighth slot S8 and the second layer of the tenth slot S10. A second V-phase fourth annular coil VB4 is inserted in the first layer of the 11th slot S11 and the second layer of the 13th slot S13 not shown. In addition, a second V-phase 12th annular coil VB12 is inserted in the second layer of the first slot S1. Though FIG. 8 shows arrangements for 12 slots (⅓ of the total 36 slots), the same arrangements are repeated for remaining fifth to 12th annular coils.

All second V-phase stator windings 7V-B are inserted in the slots on the first and second layer sides.

The second U-phase stator winding 7U-B will be described below. The slot inserting portions of a second U-phase first annular coil UB1 are inserted in the first layers of the first slot S1 and of the third slot S3 across one slot S2 interposed therebetween. A second U-phase second annular coil UB2 is inserted in the first layers of the fourth slot S4 adjacent the slot S3 in which the second U-phase first annular coil UB1 is inserted and of the sixth slot S6 across one slot S5 interposed therebetween. It is noted that the second U-phase first annular coil UB1 and the second U-phase second annular coil UB2 are connected together by a jumper as shown in FIG. 6. Specifically, the second U-phase stator winding 7U-B has an annular coil pitch at 180 electrical degrees that is equal to a magnetic pole pitch and incorporates the fractional-pitch winding for the winding pitch of the annular coil at 120 electrical degrees.

Similarly, a second U-phase third annular coil UB3 is inserted in the first layers of the seventh slot S7 and of the ninth slot S9. A second U-phase fourth annular coil UB4 is inserted in the first layers of the tenth slot S10 and of the 12th slot S12. Though FIG. 8 shows arrangements for 12 slots (⅓ of the total 36 slots), the same arrangements are repeated for remaining fifth to 12th annular coils.

All second U-phase stator windings 7U-B are inserted in the slots on the first layer side.

For example, let R0 be a distance between the center of the rotor and a central position of the coil of the first layer in the radial direction and let R0+R, R0+2R, and R0+3R be a central position of the coils in the second layer, the third layer, and the fourth layer in the radial direction, respectively, with reference to the radial central position of the first layer coil.

In the U-phase coils, the first U-phase coils 7U-A have all four annular coils inserted in the fourth layer in the range of 12 slots shown in FIG. 8, so that the radial position is represented by 8R0+24R (=4×(2R0+2×3R)). The second U-phase coils 7U-B have four annular coils inserted in the first layer in the range of 12 slots shown in FIG. 8, so that the radial position is represented by 8R0 (=4×2R0). Therefore, in the U-phase coils as a whole, the first U-phase coils 7U-A and the second U-phase coils 7U-B are added up to be represented by 16R0+24R (=8R0+24R+8R0).

In the V-phase coils, the first V-phase coils 7V-A have four annular coils inserted in the fourth and third layers in the range of 12 slots shown in FIG. 8, so that the radial position is represented by 8R0+20R (=4×(R0+3R+R0+2R)). The second V-phase coils 7V-B have four annular coils inserted in the first and second layers in the range of 12 slots shown in FIG. 8, so that the radial position is represented by 8R0+4R (=4× (R0+R+R0)). Therefore, in the V-phase coils as a whole, the first V-phase coils 7V-A and the second V-phase coils 7V-B are added up to be represented by 16R0+24R (=8R0+20R+ 8R0+4R).

In the W-phase coils, the first W-phase coils 7W-A have four annular coils inserted in the third layer in the range of 12 slots shown in FIG. 8, so that the radial position is represented by 8R0+16R (=4×(2R0+2×2R)). The second W-phase coils 7W-B have four annular coils inserted in the second layer in the range of 12 slots shown in FIG. 8, so that the radial position is represented by 8R0+8R (=4×(2×R0+2×R)). Therefore, in the W-phase coils as a whole, the first W-phase coils 7W-A and the second W-phase coils 7W-B are added up to be represented by 16R0+24R (=8R0+16R+8R0+8R).

The result of the addition of the radial distances of coils in each phase disposed in the slots for the range of 12 slots is 16R0+24R, the same for all phases.

Inductance of the stator winding is therefore the same for the U-phase, the V-phase, and the W-phase.

The balance in inductance among different phases results in the same current being generated by the different phases, so that amounts of heat generated by the stator windings and the diode balance. Then, for example, increased magnetic noise due to increased temperatures of the coils and the diode or an increased magnetic exciting force enhance quality and characteristics.

In a delta connection, the circulating current that flows through the connection does not increase and copper loss of the stator windings is not consumed, resulting in an improved power generating efficiency.

A relation of connections of each phase coil will be described below with reference to FIGS. 9 and 10. As described earlier, to obtain an output equivalent to that of the exemplary case shown in FIG. 4, each of the U-phase windings 7U-A and 7U-B has a wire size with a cross-sectional area equivalent to ½ as in the example shown in FIG. 4.

Referring to FIG. 9, in a star connection, the U-phase coil connects the first U-phase winding 7U-A and the second U-phase winding 7U-B in parallel with each other. The V-phase coil connects the first V-phase winding 7V-A and the second V-phase winding 7V-B in parallel with each other. In addition, the W-phase coil connects the first W-phase winding 7W-A and the second W-phase winding 7W-B in parallel with each other. Each of these phase coils is then connected with each other in a star connection.

Referring to FIG. 10, in a delta connection, the U-phase coil connects the first U-phase winding 7U-A and the second U-phase winding 7U-B in parallel with each other. The V-phase coil connects the first V-phase winding 7V-A and the second V-phase winding 7V-B in parallel with each other. In addition, the W-phase coil connects the first W-phase winding 7W-A and the second W-phase winding 7W-B in parallel with each other. Each of these phase coils is then connected with each other in a delta connection.

In the example shown in FIG. 2, of the 12 leads 71, two each (star connection) or four each (delta connection) are grouped into a set to form three sets in total. Connecting the leads 71 of each set allows each phase coil to connect two phase windings in parallel with each other.

At this time, a star connection includes one neutral point.

Another exemplary relation of connections of each phase coil will be described below with reference to FIGS. 11 and 12. To obtain the output equivalent to that of the exemplary case shown in FIG. 4, each of the U-phase windings 7U-A, 7U-B has the same wire size and the number of turns equally divided into half relative to the example shown in FIG. 4.

Figure 11:
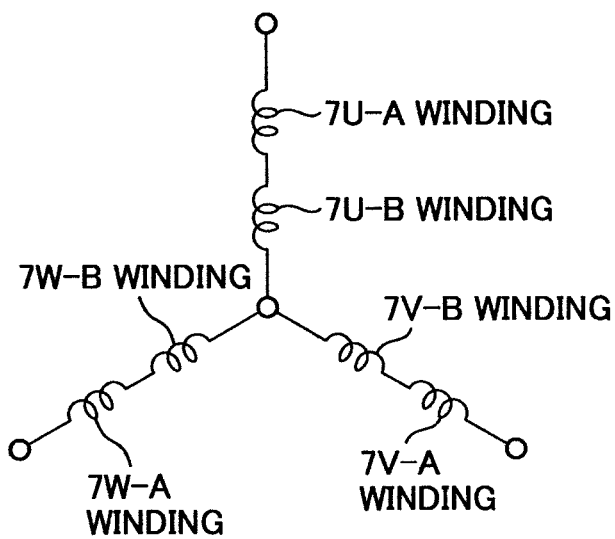
FIG. 11 is a connection diagram showing a three-phase wiring in the stator of the rotating electric machine according to the first embodiment.

Referring to FIG. 11, in a star connection, the U-phase coil connects the first U-phase winding 7U-A and the second U-phase winding 7U-B in series with each other. The V-phase coil connects the first V-phase winding 7V-A and the second V-phase winding 7V-B in series with each other. In addition, the W-phase coil connects the first W-phase winding 7W-A and the second W-phase winding 7W-B in series with each other. Each of these phase coils is then connected with each other in a star connection.

Figure 12:
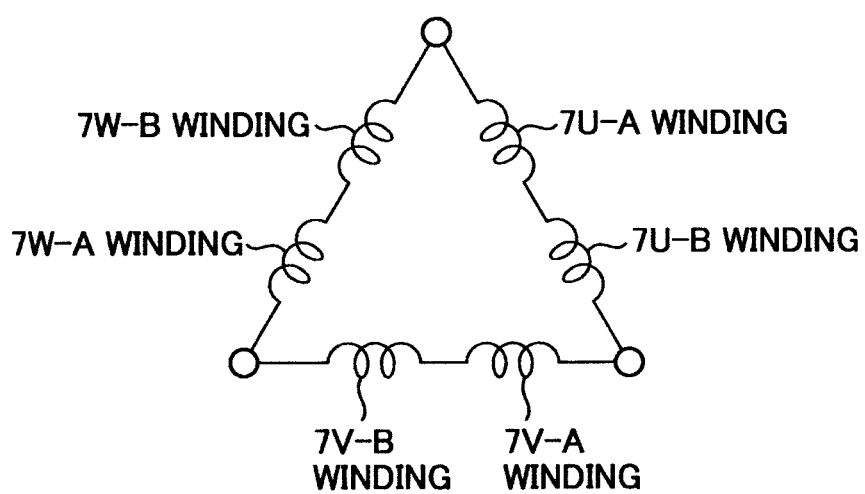
FIG. 12 is a connection diagram showing a three-phase wiring in the stator of the rotating electric machine according to the first embodiment.

Referring to FIG. 12, in a delta connection, the U-phase coil connects the first U-phase winding 7U-A and the second U-phase winding 7U-B in series with each other. The V-phase coil connects the first V-phase winding 7V-A and the second V-phase winding 7V-B in series with each other. In addition, the W-phase coil connects the first W-phase winding 7W-A and the second W-phase winding 7W-B in series with each other. Each of these phase coils is then connected with each other in a delta connection.

In the example shown in FIG. 2, of the 12 leads 71, one each (star connection) or two each (delta connection) are grouped into a set to form three sets in total. At this time, a star connection includes three nodes connected in series with one neutral point, in addition to the leads.

As described heretofore, in this embodiment, the leakage inductance is equal among different phases, inductance of each phase is equalized, and generated currents among different phases are balanced, so that a rotating electric machine offering a high output and high efficiency can be obtained.

Arrangements of a rotating electric machine according to a second embodiment will be described below with reference to FIG. 13. General arrangements of the rotating electric machine according to this embodiment are the same as those shown in FIG. 1.

Figure 13:
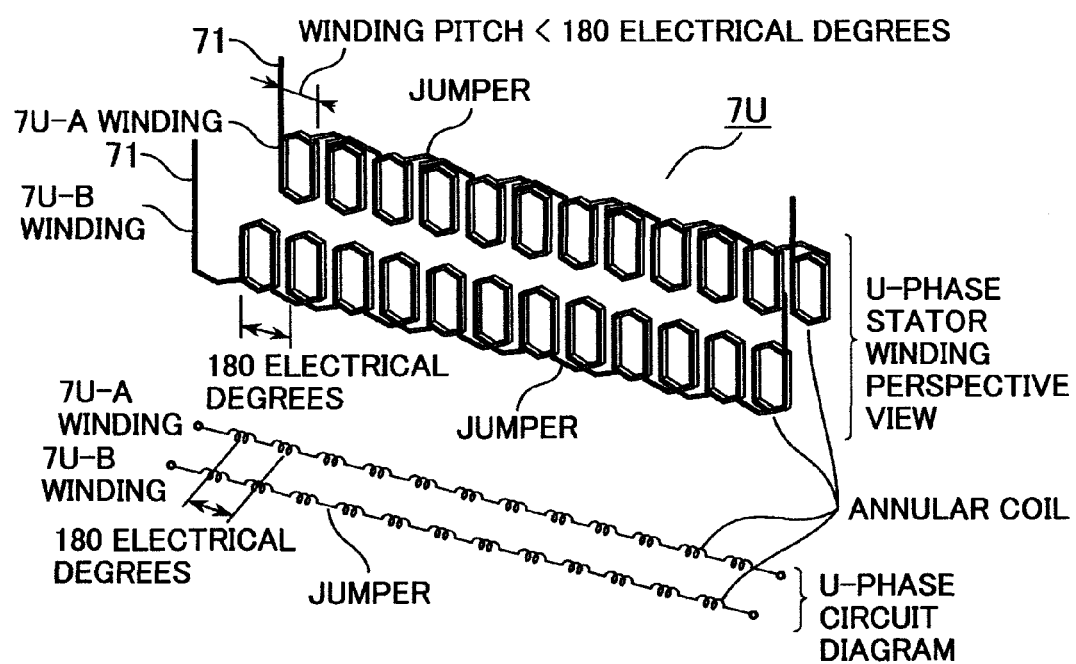
FIG. 13 is a perspective view and a circuit diagram showing a U-phase stator winding in a stator of a rotating electric machine according to a second embodiment, wound by fractional-pitch winding.

FIG. 13 is a perspective view and a circuit diagram showing a U-phase stator winding in a stator of the rotating electric machine according to the second embodiment, wound by the fractional-pitch winding.

In the example shown in FIG. 6, the jumper of the first U-phase winding 7U-A is disposed on the upper side in the figure, specifically, on the coil end side corresponding to the side of the lead 71. The jumper of the second U-phase winding 7U-B is also disposed on the upper side in the figure, specifically, on the coil end side corresponding to the side of the lead 71.

In contrast, in this embodiment shown in FIG. 13, whereas a jumper of a first U-phase winding 7U-A is disposed on the upper side in the figure, specifically, on the coil end side corresponding to the side of a lead 71, a second U-phase winding 7U-B is disposed on the lower side in the figure, specifically, on the coil end side corresponding to a side opposite the side of a lead 71. Specifically, when the first U-phase winding 7U-A and the second U-phase winding 7U-B are mounted in a stator core 6, the jumpers of the first U-phase winding 7U-A and the second U-phase winding 7U-B are evenly disposed at the coil end portions on both sides.

The same holds true with a first V-phase winding 7V-A and a second V-phase winding 7V-B of a V-phase and a first W-phase winding 7W-A and a second W-phase winding 7W-B of a W-phase, in which a jumper on one side is disposed at the coil end on a side of the lead and a jumper on the other side is disposed at the coil end on a side opposite the side of the lead.

As such, the jumpers are evenly disposed at the coil end side on the lead side and the coil end side on the side opposite the lead. This reduces the likelihood that the jumpers will interfere, so that coil insertion performance relative to the slot can be improved. In addition, a slot space factor can be improved, so that the amount of heat generated by the stator winding can be held small through reduced resistance as a result of an increased wire size.

Arrangements of a rotating electric machine according to a third embodiment will be described below with reference to FIG. 14. General arrangements of the rotating electric machine according to this embodiment are the same as those shown in FIG. 1.

Figure 14:
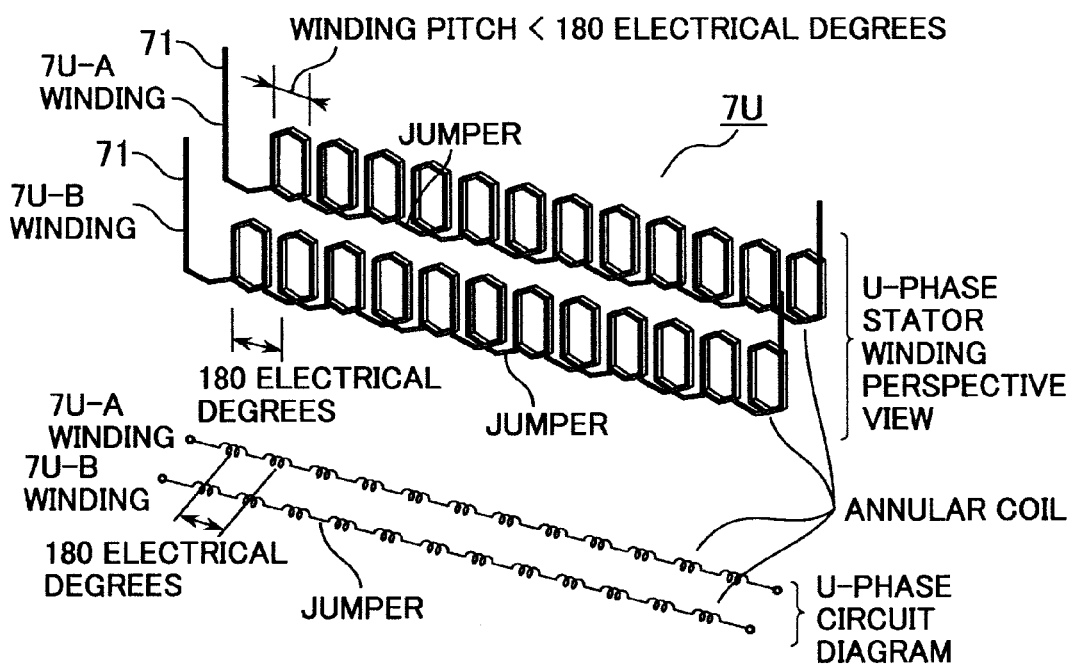
FIG. 14 is a perspective view and a circuit diagram showing a U-phase stator winding in a stator of a rotating electric machine according to a third embodiment, wound by fractional-pitch winding.

FIG. 14 is a perspective view and a circuit diagram showing a U-phase stator winding in a stator of the rotating electric machine according to the third embodiment, wound by the fractional-pitch winding.

In the example shown in FIG. 6, the jumper of the first U-phase winding 7U-A is disposed on the upper side in the figure, specifically, on the coil end side corresponding to the side of the lead 71. The second U-phase winding 7U-B is also disposed on the upper side in the figure, specifically, on the coil end side corresponding to the side of the lead 71.

In contrast, in this embodiment shown in FIG. 14, a jumper of a first U-phase winding 7U-A and a second U-phase winding 7U-B are both disposed on the lower side in the figure, specifically, on the coil end side corresponding to a side opposite the side of a lead 71.

The same holds true with a first V-phase winding 7V-A and a second V-phase winding 7V-B of a V-phase and a first W-phase winding 7W-A and a second W-phase winding 7W-B of a W-phase, in which both jumpers are disposed on the coil end side opposite the side of leads.

As such, all jumpers are disposed on the coil end side corresponding to a side opposite side of the leads. This allows a height of the coil end on the side of the lead to be held low, which offers a large space for neutral points in a connection of the leads and a star connection.

Arrangements of a rotating electric machine according to a fourth embodiment will be described below with reference to FIGS. 15 and 16. General arrangements of the rotating electric machine according to this embodiment are the same as those shown in FIG. 1. Arrangements of a stator of the rotating electric machine according to this embodiment are the same as those shown in FIG. 5.

Figure 15:
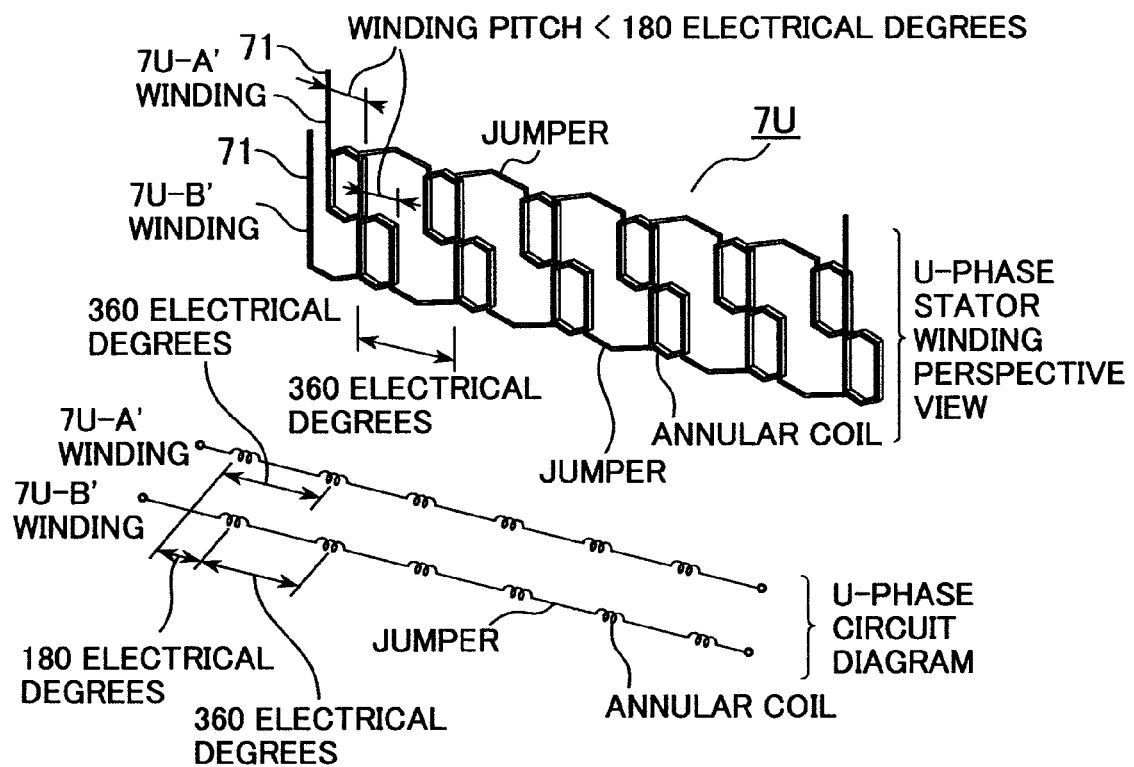
FIG. 15 is a perspective view and a circuit diagram showing a U-phase stator winding in a stator of a rotating electric machine according to a fourth embodiment, wound by fractional-pitch winding.

FIG. 15 is a perspective view and a circuit diagram showing a U-phase stator winding in the stator of the rotating electric machine according to the fourth embodiment, wound by the fractional-pitch winding. FIG. 16 is an arrangement view showing coils of different phases in slots of the stator of the rotating electric machine according to the fourth embodiment wound by the fractional-pitch winding.

Referring to FIG. 15, a U-phase winding of a stator winding 7 includes a first U-phase winding 7U-A' and a second U-phase winding 7U-B'. Each of the U-phase windings 7U-A', 7U-B' includes a plurality of annularly wound and formed coils connected with jumpers. With the 12-pole three-phase winding here exemplified, the number of annular coils is six and the six annular coils are continuously connected together by the jumpers. The annular coils are disposed at a pitch of 360 electrical degrees that doubles a magnetic pole pitch. The first U-phase winding 7U-A' and the second U-phase winding 7U-B' are formed into the U-phase stator winding, each being inserted in the slot with 180 electrical degrees out of phase from each other. The circuit diagram of the first U-phase winding 7U-A' and the second U-phase winding 7U-B' of the U-phase winding 7 shown on the upper side of FIG. 15 is shown on the lower side of FIG. 15.

It is noted that the number of slots in the stator core is 36. At this time, the front-side claw-shaped magnetic pole 11 of the rotor shown in FIG. 1 has six claw portions and the rear-side claw-shaped magnetic pole 12 also has six claw portions. Specifically, the rotor has 12 poles.

Referring to FIG. 15, each of the U-phase windings 7U-A', 7U-B' includes annular coils disposed at a pitch of 360 electrical degrees that doubles the magnetic pole pitch and the winding pitch of the annular coils is the fractional-pitch winding.

To obtain an output equivalent to that of the example shown in FIG. 4, each of the U-phase windings 7U-A', 7U-B' has the number of turns of, for example, 4T, and a wire size with a cross-sectional area equivalent to that of the example shown in FIG. 4.

A V-phase stator winding and a W-phase stator winding each are divided into two in the same manner as with the U-phase stator winding, having a first V-phase winding 7V-A', a second V-phase winding 7V-B', a first W-phase winding 7W-A', and a second W-phase winding 7W-B', respectively.

Figure 16:
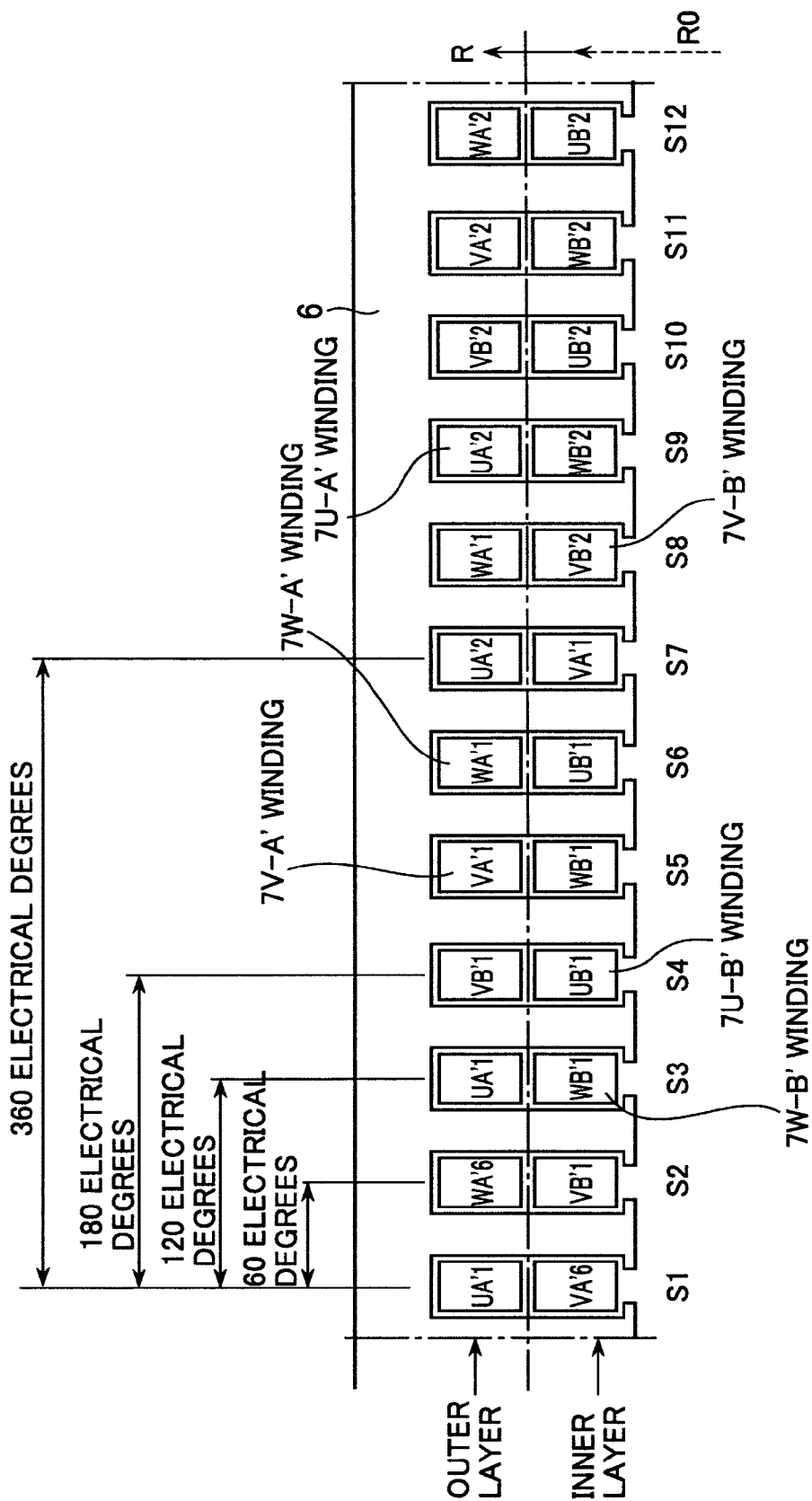
FIG. 16 is an arrangement view showing coils of different phases in slots of the stator of the rotating electric machine according to the fourth embodiment wound by fractional-pitch winding.

The stator windings 7 divided into two are inserted in the slot of the stator winding 7 in sequence in the following order, specifically, as shown in FIG. 16, the first U-phase winding 7U-A', the first V-phase winding 7V-A', the first W-phase winding 7W-A', the second W-phase winding 7W-B', the second V-phase winding 7V-B', and the second U-phase winding 7U-B' and disposed in sequence in the slot as shown in FIG. 16.

Referring to FIG. 16, coils are disposed in the slot in the stator winding 7 as a two-layer winding in which the coils are radially divided into two groups. Focusing on the U-phase stator winding, the first U-phase winding 7U-A' is disposed on the outer layer, while the second U-phase winding 7U-B' is disposed on the inner layer. The stator winding of each phase is evenly divided to the outer layer and the inner layer and the divided stator windings 7 of each phase are connected in series to thereby equalize inductance.

Order of insertion of each phase winding will be specifically described below with reference to FIG. 16.

Annular coils designated by an identical reference numeral in FIG. 16, for example, two first U-phase annular coils UA'1 indicate the annularly formed coils shown in FIG. 15. The annularly formed coil includes two linear slot inserting portions and two coil end portions, each connecting ends of the two slot inserting portions. The two first U-phase annular coils UA'1 shown in FIG. 16 represent respective slot inserting portions of one annularly formed coil. The both ends of each of the two slot inserting portions are connected together by the respective two coil end portions in portions outside respective ends of the slot. The first U-phase winding 7U-A' is inserted in the outer layer of the slot. The slot inserting portions of a first U-phase first annular coil UA'1 are inserted in a first slot S1 and a third slot S3 across one slot S2 interposed therebetween. A first U-phase second annular coil UA'2 is inserted in a seventh slot S7 that is four slots away from the slot S3 in which the first U-phase first annular coil UA'1 is inserted and in a ninth slot S9 across one slot S8 interposed therebetween. It is noted that the first U-phase first annular coil UA'1 and the first U-phase second annular coil UA'2 are connected together by a jumper as shown in FIG. 6. Specifically, the first U-phase stator winding 7U-A' has an annular coil pitch at 360 electrical degrees that doubles the magnetic pole pitch and incorporates the fractional-pitch winding for the winding pitch of the annular coil at 120 electrical degrees. FIG. 16 shows arrangements for 12 slots (⅓ of the total 36 slots) and the same arrangements are repeated for remaining third to sixth annular coils.

All first U-phase stator windings 7U-A' are inserted in the slots on the outer layer side.

The first V-phase stator winding 7V-A' will be described below. The slot inserting portions of a first V-phase first annular coil VA'1 are inserted in the outer layer of a fifth slot S5 and the inner layer of the seventh slot S7 across one slot S6 interposed therebetween. A first V-phase second annular coil VA'2 is inserted in the outer layer of an 11th slot S11 that is four slots away from the slot S7 in which the first V-phase first annular coil VA'1 is inserted and in the inner layer of a 13th slot not shown across one slot S12 interposed therebetween. It is noted that the first V-phase first annular coil VA'1 and the first V-phase second annular coil VA'2 are connected together by a jumper. Specifically, the first V-phase stator winding 7V-A' has an annular coil pitch at 360 electrical degrees that doubles the magnetic pole pitch and incorporates the fractional-pitch winding for the winding pitch of the annular coil at 120 electrical degrees.

Similarly, a first V-phase sixth annular coil VA'6 is inserted in the inner layer of the first slot S1. FIG. 16 shows arrangements for 12 slots (⅓ of the total 36 slots) and the same arrangements are repeated for remaining third to sixth annular coils.

All first V-phase stator windings 7V-A' are inserted in the slots on the outer and inner layer sides.

The first W-phase stator winding 7W-A' will be described below. The slot inserting portions of a first W-phase first annular coil WA'1 are inserted in the outer layers of a sixth slot S6 and of an eighth slot S8 across one slot S7 interposed therebetween. A first W-phase second annular coil WA'2 is inserted in the outer layers of a 12th slot S12 that is four slots away from the slot S8 in which the first W-phase first annular coil WA'1 is inserted and of a 14th slot not shown across one slot interposed therebetween. It is noted that the first W-phase first annular coil WA'1 and the first W-phase second annular coil WA'2 are connected together by a jumper. Specifically, the first W-phase stator winding 7W-A' has an annular coil pitch at 360 electrical degrees that doubles the magnetic pole pitch and incorporates the fractional-pitch winding for the winding pitch of the annular coil at 120 electrical degrees.

Similarly, a first W-phase sixth annular coil WA'6 is inserted in the outer layer of a second slot S2. FIG. 16 shows arrangements for 12 slots (⅓ of the total 36 slots) and the same arrangements are repeated for remaining third to sixth annular coils.

All first W-phase stator windings 7W-A' are inserted in the slots on the outer layer side.

The second W-phase stator winding 7W-B' will be described below. The slot inserting portions of a second W-phase first annular coil WB'1 are inserted in the inner layers of the third slot S3 and of the fifth slot S5 across one slot S4 interposed therebetween. A second W-phase second annular coil WB'2 is inserted in the inner layers of the ninth slot S9 that is four slots away from the slot S5 in which the second W-phase first annular coil WB'1 is inserted and of the 11th slot S11 across one slot S10 interposed therebetween. It is noted that the second W-phase first annular coil WB'1 and the second W-phase second annular coil are connected together by a jumper. Specifically, the second W-phase stator winding 7W-B' has an annular coil pitch at 360 electrical degrees that doubles the magnetic pole pitch and incorporates the fractional-pitch winding for the winding pitch of the annular coil at 120 electrical degrees. FIG. 16 shows arrangements for 12 slots (⅓ of the total 36 slots) and the same arrangements are repeated for remaining second to fifth annular coils.

All second W-phase stator windings 7W-B' are inserted in the slots on the inner layer side.

The second V-phase stator winding 7V-B' will be described below. The slot inserting portions of a second V-phase first annular coil VB'1 are inserted in the inner layer of the second slot S2 and the outer layer of the fourth slot S4 across one slot S3 interposed therebetween. A second V-phase second annular coil VB'2 is inserted in the inner layer of the eighth slot S8 that is four slots away from the slot S4 in which the second V-phase first annular coil VB'1 is inserted and the outer layer of a tenth slot S10 across one slot S9 interposed therebetween. It is noted that the second V-phase first annular coil VB'1 and the second V-phase second annular coil VB'2 are connected together by a jumper. Specifically, the second V-phase stator winding 7V-B' has an annular coil pitch at 360 electrical degrees that doubles the magnetic pole pitch and incorporates the fractional-pitch winding for the winding pitch of the annular coil at 120 electrical degrees. FIG. 16 shows arrangements for 12 slots (⅓ of the total 36 slots) and the same arrangements are repeated for remaining second to fifth annular coils.

All second V-phase stator windings 7V-B' are inserted in the slots on the inner and outer layer sides.

The second U-phase stator winding 7U-B' will be described below. The slot inserting portions of a second U-phase first annular coil UB'1 are inserted in the inner layers of the fourth slot S4 and of the sixth slot S6 across one slot S5 interposed therebetween. A second U-phase second annular coil UB'2 is inserted in the inner layers of the tenth slot S10 that is four slots away from the slot S6 in which the second U-phase first annular coil UB'1 is inserted and of the 12th slot S12 across one slot S11 interposed therebetween. It is noted that the second U-phase first annular coil UB'1 and the second U-phase second annular coil UB'2 are connected together by a jumper. Specifically, the second U-phase stator winding 7U-B' has an annular coil pitch at 360 electrical degrees that doubles the magnetic pole pitch and incorporates the fractional-pitch winding for the winding pitch of the annular coil at 120 electrical degrees. FIG. 16 shows arrangements for 12 slots (⅓ of the total 36 slots) and the same arrangements are repeated for remaining third to sixth annular coils.

All second U-phase stator windings 7U-B' are inserted in the slots on the inner layer side.

For example, let R0 be a distance between the center of the rotor and a central position of the coil of the inner layer in the radial direction and let R0+R be a central position of the coil in the outer layer in the radial direction with reference to the radial central position of the inner layer coil.

In the U-phase coils, the first U-phase coils 7U-A' have two annular coils inserted in the outer layer in the range of 12 slots shown in FIG. 16, so that the radial position is represented by 4R0+4R (=2×(2×R0+2×R)). The second U-phase coils 7U-B' have two annular coils inserted in the inner layer in the range of 12 slots shown in FIG. 16, so that the radial position is represented by 4R0 (=2×R0). Therefore, the U-phase coils as a whole are represented by 8R0+4R (=4R0+4R+4R0).

In the V-phase coils, the first V-phase coils 7V-A' have two annular coils inserted in the outer and inner layers, respectively, in the range of 12 slots shown in FIG. 16, so that the radial position is represented by 4R0+2R (=2×(R0+R+R0)). The second V-phase coils 7V-B' have two annular coils inserted in the inner and outer layers, respectively, in the range of 12 slots shown in FIG. 16, so that the radial position is represented by 4R0+2R (=2×(R0+R+R0)). Therefore, the V-phase coils as a whole are represented by 8R0+4R (=4R0+2R+4R0+2R).

In the W-phase coils, the first W-phase coils 7W-A' have two annular coils inserted in the outer layer in the range of 12 slots shown in FIG. 16, so that the radial position is represented by 4R0+4R (=2×(2×R0+2×R)). The second W-phase coils 7W-B' have two annular coils inserted in the inner layer in the range of 12 slots shown in FIG. 16, so that the radial position is represented by 4R0 (=4×2×R0). Therefore, the W-phase coils as a whole are represented by 8R0+4R (=4R0+4R+4R0).

The result of the addition of the radial distances of coils in each phase disposed in the slots for the range of 12 slots is 8R0+4R, the same for all phases.

Inductance of the stator winding is therefore the same for the U-phase, the V-phase, and the W-phase.

The balance in inductance among different phases results in the same current being generated by the different phases, so that amounts of heat generated by the stator windings and the diode balance. Then, for example, increased magnetic noise due to increased temperatures of the coils and the diode or an increased magnetic exciting force enhance quality and characteristics.

In a delta connection, the circulating current that flows through the connection does not increase and copper loss of the stator windings is not consumed, resulting in an improved power generating efficiency.

It is noted that use of a wire size having a ½ cross-sectional area and parallel connection of stator windings having annular coils with twice as many number of turns achieve same power generating characteristics and equalized inductance.

As described heretofore, in this embodiment, the leakage inductance is equal among different phases, inductance of each phase is equalized, and generated currents among different phases are balanced, so that a rotating electric machine offering a high output and high efficiency can be obtained.

Arrangements of a rotating electric machine according to a fifth embodiment will be described below with reference to FIGS. 17 through 22. General arrangements of the rotating electric machine according to this embodiment are the same as those shown in FIG. 1.

Figure 17:
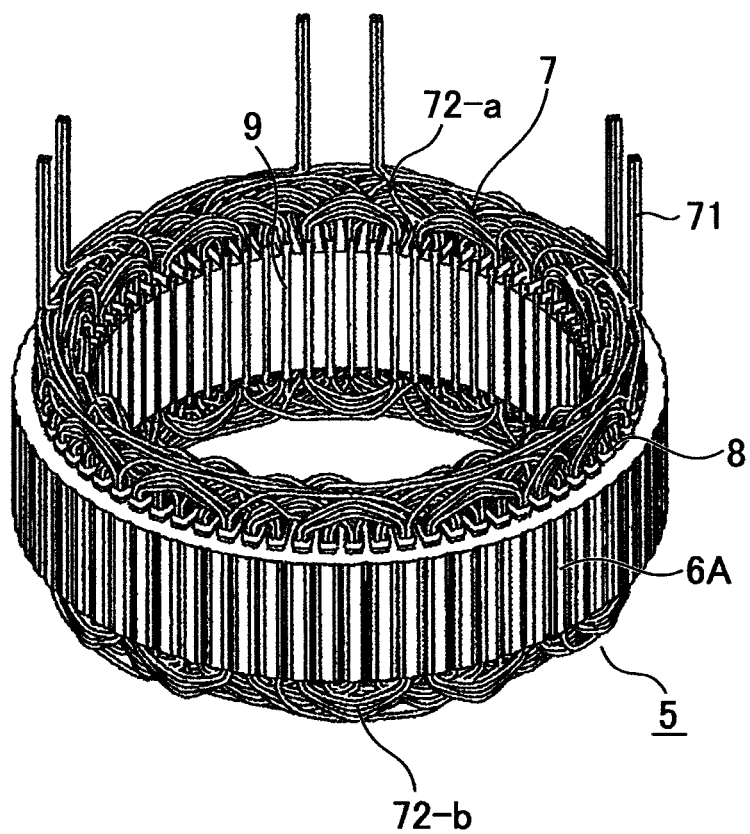
FIG. 17 is a perspective view showing a stator of a rotating electric machine according to a fifth embodiment, wound by fractional-pitch winding.
Figure 18:
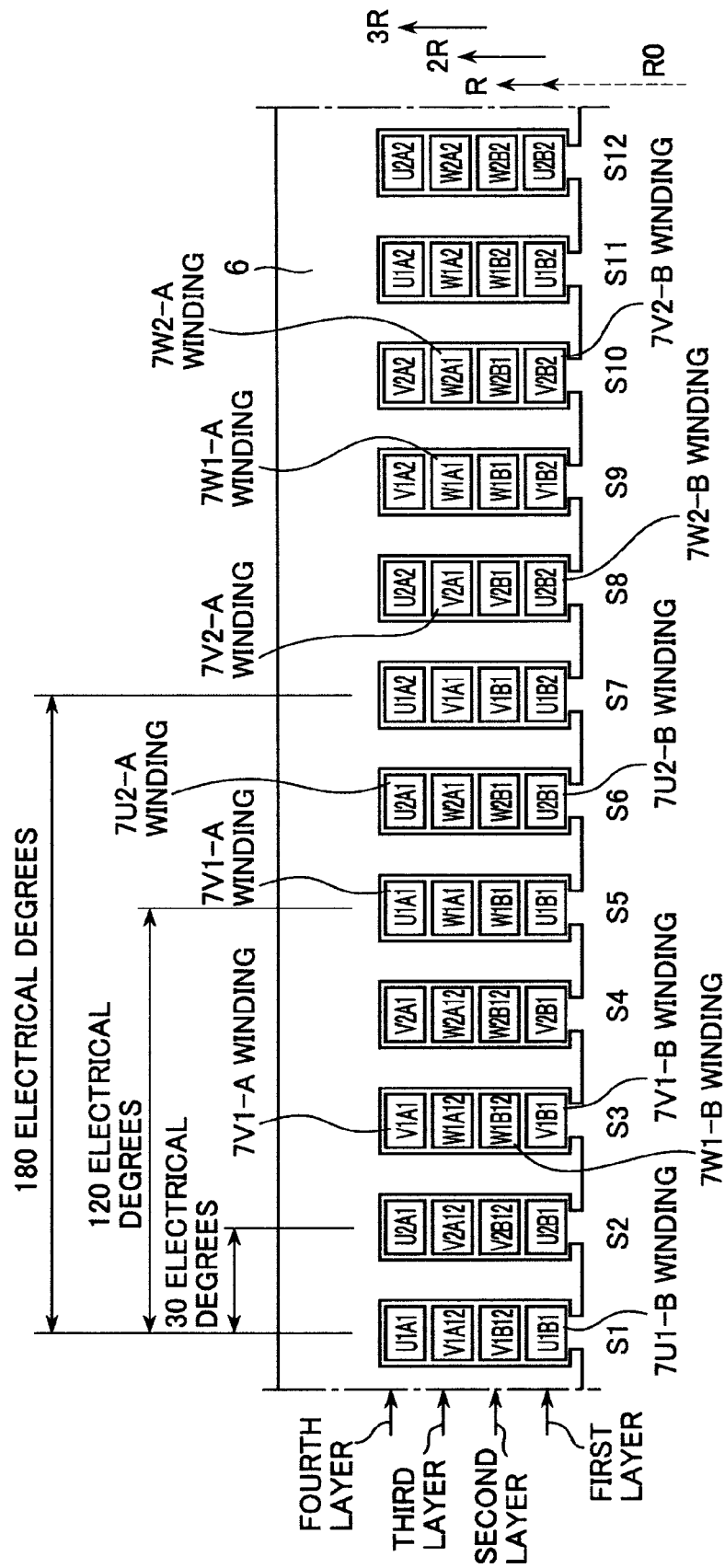
FIG. 18 is an arrangement view showing coils of different phases in slots of the stator of the rotating electric machine according to the fifth embodiment wound by fractional-pitch winding.

FIG. 17 is a perspective view showing a stator of the rotating electric machine according to the fifth embodiment, wound by the fractional-pitch winding. FIG. 18 is an arrangement view showing coils of different phases within slots of the stator of the rotating electric machine according to the fifth embodiment wound by the fractional-pitch winding. Like or corresponding parts are identified by the same reference numerals as those used in FIG. 5. FIGS. 19 to 22 are connection diagrams showing the stator of the rotating electric machine according to the fifth embodiment, wound by the fractional-pitch winding.

Each of the first to fourth embodiments is concerned with a single three-phase winding. The embodiment shown in FIG. 17 is concerned with two three-phase windings including the stator core having the number of slots twice as many, each of the windings being 30 electrical degrees out of phase from each other. In this example, the number of slots is 72. The configuration having two three-phase windings reduces both magnetic noise and ripple voltage. FIG. 17 shows a stator 5 that includes a stator core 6A having 72 slots and wound with a stator winding 7 by the fractional-pitch winding.

The stator core has 72 slots. At this time, the front-side claw-shaped magnetic pole 11 of the rotor shown in FIG. 1 has six claw portions and the rear-side claw-shaped magnetic pole 12 has also six claw portions. Specifically, the rotor has 12 poles.

FIG. 18 shows arrangements of coils in different phases. The stator winding 7 includes two three-phase windings. A first three-phase winding includes a U1-phase, a V1-phase, and a W1-phase and a second three-phase winding includes a U2-phase, a V2-phase, and a W2-phase. The U1-phase and the U2-phase are 30 electrical degrees out of phase from each other. The V1-phase and the V2-phase, and the W1-phase and the W2-phase, are 30 electrical degrees out of phase from each other, respectively.

The U1-phase winding of the stator winding 7 is divided into two windings, 7U1-A and 7U1-B. Each of the U-phase windings 7U1-A and 7U1-B includes a plurality of annularly wound and formed coils connected with jumpers at a pitch of 180 electrical degrees. With the 12-pole three-phase winding here exemplified, the number of annular coils is 12 and the 12 annular coils are continuously connected together by the jumpers. Winding configuration is as shown in FIG. 6 that represents the first embodiment.

Referring to FIG. 18, the U1-phase windings 7U1-A and 7U1-B have an annular coil pitch at 180 electrical degrees that is equal to the magnetic pole pitch and incorporates the fractional-pitch winding for the winding pitch of the annular coil at 120 electrical degrees.

Similarly to the U1-phase stator winding, a V1-phase stator winding, a W1-phase stator winding, a U2-phase stator winding, a V2-phase stator winding, and a W2-phase stator winding are divided into V1-phase windings 7V1-A and 7V1-B, W1-phase stator windings 7W1-A and 7W1-B, U2-phase stator windings 7U2-A and 7U2-B, V2-phase windings 7V2-A and 7V2-B, and W2-phase stator windings 7W2-A and 7W2-B, respectively.

First three-phase windings include the U1-phase windings 7U1-A and 7U1-B, the V1-phase windings 7V1-A and 7V1-

B, and the W1-phase windings 7W1-A and 7W1-B. Second three-phase windings include the U2-phase windings 7U2-A and 7U2-B, the V2-phase windings 7V2-A and 7V2-B, and the W2-phase windings 7W2-A and 7W2-B.

Each of the stator windings 7 is inserted in the slot in sequence in the following order, specifically, as shown in FIG. 18, the U1-phase winding 7U1-A, the U2-phase winding 7U2-A, the V1-phase winding 7V1-A, the V2-phase winding 7V2-A, the W1-phase winding 7W1-A, the W2-phase winding 7W2-A, the W1-phase winding 7W1-B, the W2-phase winding 7W2-B, the V1-phase winding 7V1-B, the V2-phase winding 7V2-B, the U1-phase winding 7U1-B, and the U2-phase winding 7U2-B are disposed in sequence in the slot as shown in FIG. 18.

Referring to FIG. 18, coils are disposed in the slot in the stator winding 7 as a four-layer winding in which the coils are radially divided into four groups. Let a first layer be an innermost side of the slots and a fourth layer be an outermost side thereof. Then, the first and fourth layers are of the same phase and the second and third layers are of the same phase. Then, the phases are connected in parallel with each other, which combines inductance and the inductance of each phase is equalized, so that balance is achieved in generated currents.

Referring to FIG. 18, the U1-phase winding 7U1-A, the U2-phase winding 7U2-A, the V1-phase winding 7V1-A, the V2-phase winding 7V2-A, the W1-phase winding 7W1-A, and the W2-phase winding 7W2-A, and the W1-phase winding 7W1-B, the W2-phase winding 7W2-B, the V1-phase winding 7V1-B, the V2-phase winding 7V2-B, the U1-phase winding 7U1-B, and the U2-phase winding 7U2-B are axisymmetrically inserted with reference to a line between the second and third layers. Specifically, whereas the U1-phase winding 7U1-A and the U2-phase winding 7U2-A are inserted in the fourth layer, the U1-phase winding 7U1-B and the U2-phase winding 7U2-B are inserted in the first layer. Whereas the V1-phase winding 7V1-A and the V2-phase winding 7V2-A are inserted in the fourth and third layers, the V1-phase winding 7V1-B and the V2-phase winding 7V2-B are inserted in the first and second layers. In addition, whereas the W1-phase winding 7W1-A and the W2-phase winding 7W2-A are inserted in the third layer, the W1-phase winding 7W1-B and the W2-phase winding 7W2-B are inserted in the second layer.

Order of insertion of each phase winding will be specifically described below with reference to FIG. 18.

Annular coils designated by an identical reference numeral in FIG. 18, for example, two coils designated by U1A1 of the U1-phase stator windings 7U1-A indicate the annularly formed coils. The annularly formed coil includes two linear slot inserting portions and two coil end portions, each connecting ends of the two slot inserting portions. The two U1-phase annular coils U1A1 shown in FIG. 18 represent respective slot inserting portions of one annularly formed coil. The both ends of each of the two slot inserting portions are connected together by the respective two coil end portions in portions outside respective ends of the slot. The U1-phase annular coil 7U1-A is inserted in the fourth layer of the slot. The slot inserting portions of a U1-phase first annular coil U1A1 are inserted in a first slot S1 and a fifth slot S5 across three slots interposed therebetween. A U1-phase second annular coil U1A2 is inserted in a seventh slot S7 that is one slot away from the slot S5 in which the U1-phase first annular coil U1A1 is inserted and in an 11th slot S11 across three slots interposed therebetween. It is noted that the U1-phase first annular coil U1A1 and the U1-phase second annular coil U1A2 are connected together by a jumper. Specifically, the U1-phase stator winding 7U1-A has an annular coil pitch at 180 electrical degrees that is equal to the magnetic pole pitch and incorporates the fractional-pitch winding for the winding pitch of the annular coil at 120 electrical degrees. FIG. 18 shows arrangements for 12 slots (⅙ of the total 72 slots) and the same arrangements are repeated for remaining third to 12th annular coils.

All U1-phase stator windings 7U1-A are inserted in the slots on the fourth layer side.

The U2-phase stator winding 7U2-A will be described below. The U2-phase stator winding 7U2-A is inserted in the fourth layer of the slot. The slot inserting portions of a U2-phase first annular coil U2A1 are inserted in a second slot S2 and a sixth slot S6 across three slots interposed therebetween. A U2-phase second annular coil U2A2 is inserted in an eighth slot S8 that is one slot away from the slot S6 in which the U2-phase first annular coil U2A1 is inserted and in a 12th slot S12 across three slots interposed therebetween. It is noted that the U2-phase first annular coil U2A1 and the U2-phase second annular coil U2A2 are connected together by a jumper. Specifically, the U2-phase stator winding 7U2-A has an annular coil pitch at 180 electrical degrees that is equal to the magnetic pole pitch and incorporates the fractional-pitch winding for the winding pitch of the annular coil at 120 electrical degrees. FIG. 18 shows arrangements for 12 slots (⅙ of the total 72 slots) and the same arrangements are repeated for remaining third to 12th annular coils.

All U2-phase stator windings 7U2-A are inserted in the slots on the fourth layer side.

The V1-phase stator winding 7V1-A will be described below. The slot inserting portions of a V1-phase first annular coil V1A1 are inserted in the fourth layer of a third slot S3 and the third layer of the seventh slot S7 across three slots interposed therebetween. A V1-phase second annular coil V1A2 is inserted in the fourth layer of a ninth slot S9 that is one slot away from the slot S7 in which the V1-phase first annular coil V1A1 is inserted and the third layer of a 13th slot (not shown) across three slots interposed therebetween. It is noted that the V1-phase first annular coil V1A1 and the V1-phase second annular coil V1A2 are connected together by a jumper. Specifically, the V1-phase stator winding 7V1-A has an annular coil pitch at 180 electrical degrees that is equal to the magnetic pole pitch and incorporates the fractional-pitch winding for the winding pitch of the annular coil at 120 electrical degrees.

Similarly, a V1-phase 12th annular coil V1A12 is inserted in the third layer of the first slot S1. FIG. 18 shows arrangements for 12 slots (⅙ of the total 72 slots) and the same arrangements are repeated for remaining third to 12th annular coils.

All V1-phase stator windings 7V1-A are inserted in the slots on the fourth and third layer sides.

The V2-phase stator winding 7V2-A will be described below. The slot inserting portions of a V2-phase first annular coil V2A1 are inserted in the fourth layer of a fourth slot S4 and the third layer of the eighth slot S8 across three slots interposed therebetween. A V2-phase second annular coil V2A2 is inserted in the fourth layer of a tenth slot S10 that is one slot away from the slot S8 in which the V2-phase first annular coil V2A1 is inserted and the third layer of a 14th slot (not shown) across three slots interposed therebetween. It is noted that the V2-phase first annular coil V2A1 and the V2-phase second annular coil V2A2 are connected together by a jumper. Specifically, the V2-phase stator winding 7V2-A has an annular coil pitch at 180 electrical degrees that is equal to the magnetic pole pitch and incorporates the fractional-pitch winding for the winding pitch of the annular coil at 120 electrical degrees.

Similarly, a V2-phase 12th annular coil V2A12 is inserted in the third layer of the second slot S2. FIG. 18 shows arrangements for 12 slots (⅙ of the total 72 slots) and the same arrangements are repeated for remaining third to 12th annular coils.

All V2-phase stator windings 7V2-A are inserted in the slots on the fourth and third layer sides.

The W1-phase stator winding 7W1-A will be described below. The slot inserting portions of a W1-phase first annular coil W1A1 are inserted in the third layers of the fifth slot S5 and of the ninth slot S9 across three slots interposed therebetween. A W1-phase second annular coil W1A2 is inserted in the 11th slot S11 that is one slot away from the slot S9 in which the W1-phase first annular coil W1A1 is inserted and a 15th slot (not shown) across three slots interposed therebetween. It is noted that the W1-phase first annular coil W1A1 and the W1-phase second annular coil W1A2 are connected together by a jumper. Specifically, the W1-phase stator winding 7W1-A has an annular coil pitch at 180 electrical degrees that is equal to the magnetic pole pitch and incorporates the fractional-pitch winding for the winding pitch of the annular coil at 120 electrical degrees.

Similarly, a W1-phase 12th annular coil W1A12 is inserted in the third layer of the third slot S3. FIG. 18 shows arrangements for 12 slots (⅙ of the total 72 slots) and the same arrangements are repeated for remaining third to 12th annular coils.

All W1-phase stator windings 7W1-A are inserted in the slots on the third layer side.

The W2-phase stator winding 7W2-A will be described below. The slot inserting portions of a W2-phase first annular coil W2A1 are inserted in the third layers of the sixth slot S6 and of the tenth slot S10 across three slots interposed therebetween. A W2-phase second annular coil W2A2 is inserted in the 12th slot S12 that is one slot away from the slot S10 in which the W2-phase first annular coil W2A1 is inserted and a 16th slot (not shown) across three slots interposed therebetween. It is noted that the W2-phase first annular coil W2A1 and the W2-phase second annular coil W2A2 are connected together by a jumper. Specifically, the W2-phase stator winding 7W2-A has an annular coil pitch at 180 electrical degrees that is equal to the magnetic pole pitch and incorporates the fractional-pitch winding for the winding pitch of the annular coil at 120 electrical degrees.

Similarly, a W2-phase 12th annular coil W2A12 is inserted in the fourth layer of the fourth slot S4. FIG. 18 shows arrangements for 12 slots (⅙ of the total 72 slots) and the same arrangements are repeated for remaining third to 12th annular coils.

All W2-phase stator windings 7W2-A are inserted in the slots on the third layer side.

The W1-phase stator winding 7W1-B will be described below. The slot inserting portions of a W1-phase first annular coil W1B1 are inserted in the second layers of the fifth slot S5 and of the ninth slot S9 across three slots interposed therebetween. A W1-phase second annular coil W1B2 is inserted in the 11th slot S11 that is one slot away from the slot S9 in which the W1-phase first annular coil W1B1 is inserted and the 15th slot (not shown) across three slots interposed therebetween. It is noted that the W1-phase first annular coil W1B1 and the W1-phase second annular coil W1B2 are connected together by a jumper. Specifically, the W1-phase stator winding 7W1-B has an annular coil pitch at 180 electrical degrees that is equal to the magnetic pole pitch and incorporates the fractional-pitch winding for the winding pitch of the annular coil at 120 electrical degrees.

Similarly, a W1-phase 12th annular coil W1B12 is inserted in the second layer of the third slot S3. FIG. 18 shows arrangements for 12 slots (⅙ of the total 72 slots) and the same arrangements are repeated for remaining third to 12th annular coils.

All W1-phase stator windings 7W1-B are inserted in the slots on the second layer side.

The W2-phase stator winding 7W2-B will be described below. The slot inserting portions of a W2-phase first annular coil W2B1 are inserted in the second layers of the sixth slot S6 and of the tenth slot S10 across three slots interposed therebetween. A W2-phase second annular coil W2B2 is inserted in the 12th slot S12 that is one slot away from the slot S10 in which the W2-phase first annular coil W2B1 is inserted and the 16th slot (not shown) across three slots interposed therebetween. It is noted that the W2-phase first annular coil W2B1 and the W2-phase second annular coil W2B2 are connected together by a jumper. Specifically, the W2-phase stator winding 7W2-B has an annular coil pitch at 180 electrical degrees that is equal to the magnetic pole pitch and incorporates the fractional-pitch winding for the winding pitch of the annular coil at 120 electrical degrees.

Similarly, a W2-phase 12th annular coil W2B12 is inserted in the second layer of the fourth slot S4. FIG. 18 shows arrangements for 12 slots (⅙ of the total 72 slots) and the same arrangements are repeated for remaining third to 12th annular coils.

All W2-phase stator windings 7W2-B are inserted in the slots on the second layer side.

The V1-phase stator winding 7V1-B will be described below. The slot inserting portions of a V1-phase first annular coil V1B1 are inserted in the first layer of the third slot S3 and the second layer of the seventh slot S7 across three slots interposed therebetween. The slot inserting portions of a V1-phase second annular coil V1B2 are inserted in the first layer of the ninth slot S9 and the second layer of the 13th slot (not shown) across three slots interposed therebetween. It is noted that the V1-phase first annular coil V1B1 and the V1-phase second annular coil V1B2 are connected together by a jumper. Specifically, the V1-phase stator winding 7V1-B has an annular coil pitch at 180 electrical degrees that is equal to the magnetic pole pitch and incorporates the fractional-pitch winding for the winding pitch of the annular coil at 120 electrical degrees.

Similarly, a V1-phase 12th annular coil V1B12 is inserted in the second layer of the first slot S1. FIG. 18 shows arrangements for 12 slots (⅙ of the total 72 slots) and the same arrangements are repeated for remaining third to 12th annular coils.

All V1-phase stator windings 7V1-B are inserted in the slots on the second and first layer sides.

The V2-phase stator winding 7V2-B will be described below. The slot inserting portions of a V2-phase first annular coil V2B1 are inserted in the first layer of the fourth slot S4 and the second layer of the eighth slot S8 across three slots interposed therebetween. A V2-phase second annular coil V2B2 is inserted in the first layer of the tenth slot S10 that is one slot away from the slot S8 in which the V2-phase first annular coil V2B1 is inserted and the second layer of the 14th slot (not shown) across three slots interposed therebetween. It is noted that the V2-phase first annular coil V2B1 and the V2-phase second annular coil V2B2 are connected together by a jumper. Specifically, the V2-phase stator winding 7V2-B has an annular coil pitch at 180 electrical degrees that is equal to the magnetic pole pitch and incorporates the fractional-pitch winding for the winding pitch of the annular coil at 120 electrical degrees.

Similarly, a V2-phase 12th annular coil V2B12 is inserted in the second layer of the second slot S2. FIG. 18 shows arrangements for 12 slots (⅙ of the total 72 slots) and the same arrangements are repeated for remaining third to 12th annular coils.

All V2-phase stator windings 7V2-B are inserted in the slots on the second and first layer sides.

The U1-phase stator winding 7U1-B will be described below. The U1-phase annular coil 7U1-B is inserted in the first layer of the slot. The slot inserting portions of a U1-phase first annular coil U1B1 are inserted in the first slot S1 and the fifth slot S5 across three slots interposed therebetween. A U1-phase second annular coil U1B2 is inserted in the seventh slot S7 that is one slot away from the slot S5 in which the U1-phase first annular coil U1B1 is inserted and the 11th slot S11 across three slots interposed therebetween. It is noted that the U1-phase first annular coil U1B1 and the U1-phase second annular coil U1B2 are connected together by a jumper. Specifically, the U1-phase stator winding 7U1-B has an annular coil pitch at 180 electrical degrees that is equal to the magnetic pole pitch and incorporates the fractional-pitch winding for the winding pitch of the annular coil at 120 electrical degrees. FIG. 18 shows arrangements for 12 slots (⅙ of the total 72 slots) and the same arrangements are repeated for remaining third to 12th annular coils.

All U1-phase stator windings 7U1-B are inserted in the slots on the first layer side.

The U2-phase stator winding 7U2-B will be described below. The U2-phase stator winding 7U2-B is inserted in the first layer of the slot. The slot inserting portions of a U2-phase first annular coil U2B1 are inserted in the second slot S2 and the sixth slot S6 across three slots interposed therebetween. A U2-phase second annular coil U2B2 is inserted in the eighth slot S8 that is one slot away from the slot S6 in which the U2-phase first annular coil U2B1 is inserted and the 12th slot S12 across three slots interposed therebetween. It is noted that the U2-phase first annular coil U2B1 and the U2-phase second annular coil U2B2 are connected together by a jumper. Specifically, the U2-phase stator winding 7U2-B has an annular coil pitch at 180 electrical degrees that is equal to the magnetic pole pitch and incorporates the fractional-pitch winding for the winding pitch of the annular coil at 120 electrical degrees. FIG. 18 shows arrangements for 12 slots (⅙ of the total 72 slots) and the same arrangements are repeated for remaining third to 12th annular coils.

All U2-phase stator windings 7U2-B are inserted in the slots on the first layer side.

For example, let R0 be a distance between the center of the rotor and a central position of the coil of the first layer in the radial direction and let R0+R, R0+2R, and R0+3R be a central position of the coils in the second layer, the third layer, and the fourth layer in the radial direction, respectively, with reference to the radial central position of the first layer coil.

In the U1-phase coils, the U1-phase coils 7U1-A have all two annular coils inserted in the fourth layer in the range of 12 slots shown in FIG. 18, so that the radial position is represented by 4R0+12R (=2×(2×R0+2×3R)). The U1-phase coils 7U1-B have four annular coils inserted in the first layer in the range of 12 slots shown in FIG. 18, so that the radial position is represented by 4R0 (=2×2R0). Therefore, in the U1-phase coils as a whole, the U1-phase coils 7U1-A and the U1-phase coils 7U1-B are added up to be represented by 8R0+12R (=4R0+12R+4R0).

In the U2-phase coils, the U2-phase coils 7U2-A have all two annular coils inserted in the fourth layer in the range of 12 slots shown in FIG. 18, so that the radial position is represented by 4R0+12R (=2×(2×R0+2×3R)). The U2-phase coils 7U2-B have two annular coils inserted in the first layer in the range of 12 slots shown in FIG. 18, so that the radial position is represented by 4R0 (=2×2R0). Therefore, in the U2-phase coils as a whole, the U2-phase coils 7U2-A and the U2-phase coils 7U2-B are added up to be represented by 8R0+12R (=4R0+12R+4R0).

In the V1-phase coils, the V1-phase coils 7V1-A have two annular coils inserted in the fourth and third layers, respectively, in the range of 12 slots shown in FIG. 18, so that the radial position is represented by 4R0+10R (=2×(R0+3R+R0+2R)). The V1-phase coils 7V1-B have two annular coils inserted in the first and second layers, respectively, in the range of 12 slots shown in FIG. 18, so that the radial position is represented by 4R0+2R (=2×(R0+R+R0)). Therefore, in the V1-phase coils as a whole, the V1-phase coils 7V1-A and the V1-phase coils 7V1-B are added up to be represented by 8R0+12R (=4R0+10R+4R0+2R).

In the V2-phase coils, the V2-phase coils 7V2-A have two annular coils inserted in the fourth and third layers, respectively, in the range of 12 slots shown in FIG. 18, so that the radial position is represented by 4R0+10R (=2×(R0+3R+R0+2R)). The V2-phase coils 7V2-B have two annular coils inserted in the first and second layers, respectively, in the range of 12 slots shown in FIG. 18, so that the radial position is represented by 4R0+2R (=2×(R0+R+R0)). Therefore, in the V2-phase coils as a whole, the V2-phase coils 7V2-A and the V2-phase coils 7V2-B are added up to be represented by 8R0+12R (=4R0+10R+4R0+2R).

In the W1-phase coils, the W1-phase coils 7W1-A have two annular coils inserted in the third layer in the range of 12 slots shown in FIG. 18, so that the radial position is represented by 4R0+8R (=2×(2R0+2×2R)). The W1-phase coils 7W1-B have two annular coils inserted in the second layer in the range of 12 slots shown in FIG. 18, so that the radial position is represented by 4R0+4R (=2×(2R0+2R)). Therefore, in the W1-phase coils as a whole, the W1-phase coils 7W1-A and the W1-phase coils 7W1-B are added up to be represented by 8R0+12R (=4R0+8R+4R0+4R).

In the W2-phase coils, the W2-phase coils 7W2-A have two annular coils inserted in the third layer in the range of 12 slots shown in FIG. 18, so that the radial position is represented by 4R0+8R (=2×(2R0+2×2R)). The W2-phase coils 7W2-B have two annular coils inserted in the second layer in the range of 12 slots shown in FIG. 18, so that the radial position is represented by 4R0+4R (=2×(2R0+2R)). Therefore, in the W2-phase coils as a whole, the W2-phase coils 7W2-A and the W2-phase coils 7W2-B are added up to be represented by 8R0+12R (=4R0+8R+4R0+4R).

The result of the addition of the radial distances of coils in each phase disposed in the slots for the range of 12 slots is 8R0+12R, the same for all stator windings of the U1-phase, the V1-phase, the W1-phase, the U2-phase, the V2-phase, and the W2-phase.

Inductance of the stator windings of the U1-phase, the V1-phase, the W1-phase, the U2-phase, the V2-phase, and the W2-phase is therefore the same, so that imbalance does not occur in inductance of the stator windings of different phases.

The balance in inductance among different phases results in the same current being generated by the different phases, so that amounts of heat generated by the stator windings and the diode balance. Then, for example, increased magnetic noise due to increased temperatures of the coils and the diode or an increased magnetic exciting force enhance quality and characteristics.

A relation of connections of each phase coil will be described below with reference to FIGS. 19 and 20.

Figure 19:
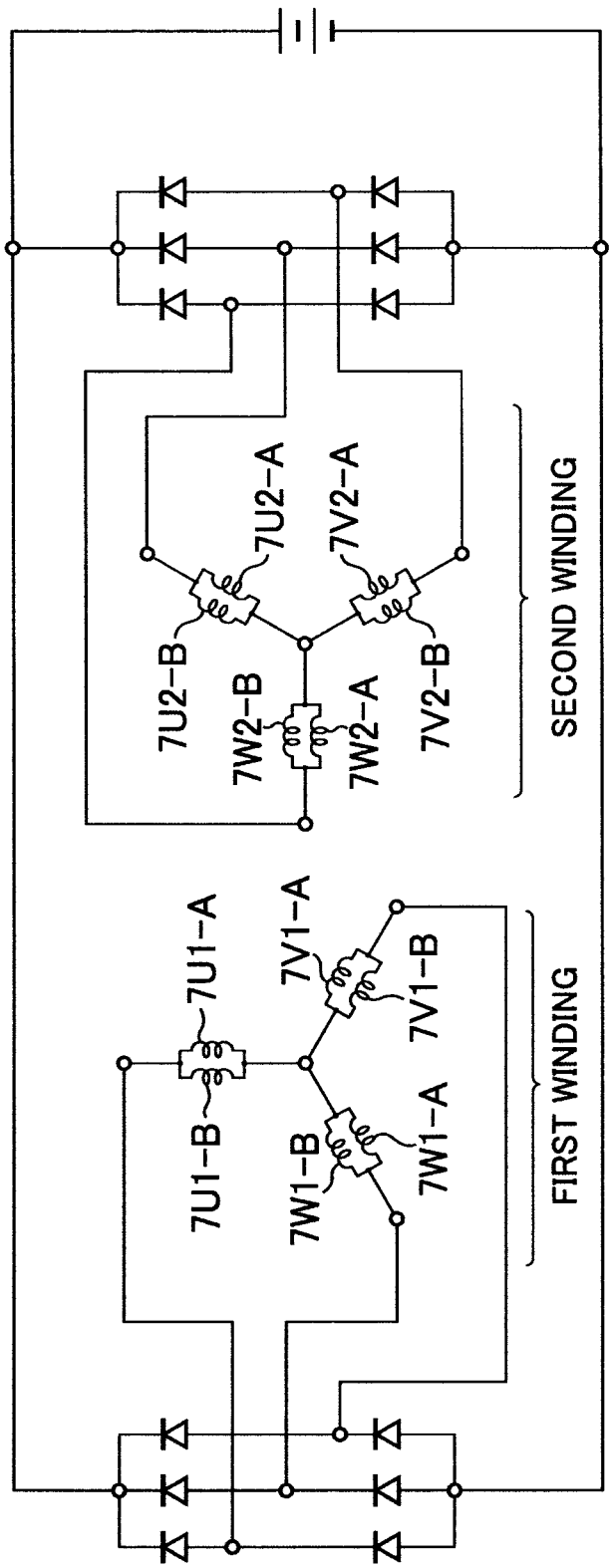
FIG. 19 is a connection diagram showing the stator of the rotating electric machine according to the fifth embodiment, wound by fractional-pitch winding.

Referring to FIG. 19, in the first winding, in a star connection, the U1-phase coil connects 7U1-A and 7U1-B in parallel with each other. The V1-phase coil connects 7V1-A and 7V1-B in parallel with each other. In addition, the W1-phase coil connects 7W1-A and 7W1-B in parallel with each other. Each of these phase coils is then connected with each other in a star connection. In the second winding, too, the U2-phase coil connects 7U2-A and 7U2-B in parallel with each other. The V2-phase coil connects 7V2-A and 7V2-B in parallel with each other. In addition, the W2-phase coil connects 7W-A and 7W2-B in parallel with each other. Each of these phase coils is then connected with each other in a star connection.

Figure 20:
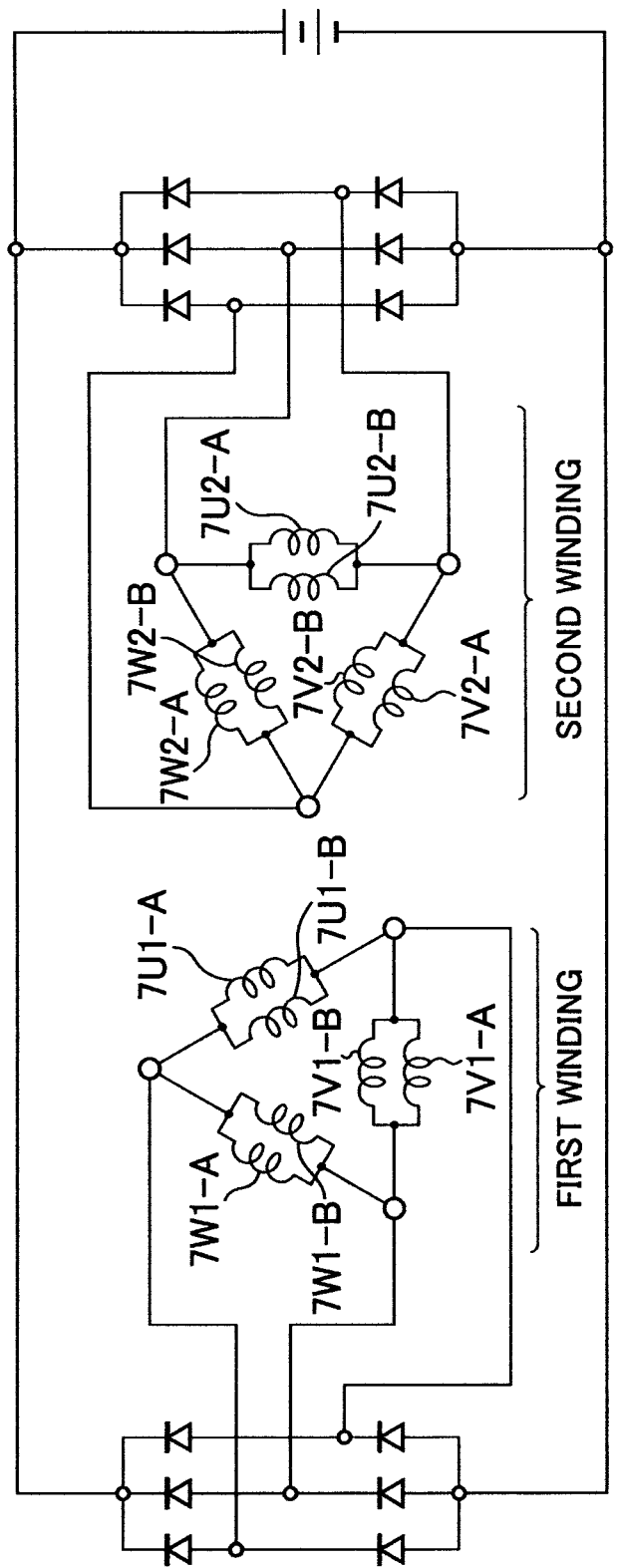
FIG. 20 is a connection diagram showing the stator of the rotating electric machine according to the fifth embodiment, wound by fractional-pitch winding.

Referring to FIG. 20, in the first winding, in a delta connection, the U1-phase coil connects 7U1-A and 7U1-B in parallel with each other. The V1-phase coil connects 7V1-A and 7V1-B in parallel with each other. In addition, the W1-phase coil connects 7W1-A and 7W1-B in parallel with each other. Each of these phase coils is then connected with each other in a delta connection. In the second winding, too, the U2-phase coil connects 7U2-A and 7U2-B in parallel with each other. The V2-phase coil connects 7V2-A and 7V2-B in parallel with each other. In addition, the W2-phase coil connects 7W-A and 7W2-B in parallel with each other. Each of these phase coils is then connected with each other in a delta connection.

In the example shown in FIG. 17, of the 24 leads 71, two each (star connection) or four each (delta connection) are grouped into a set to form six sets in total. Connecting the leads 71 of each set allows each phase coil to make a parallel connection of windings of the same phase.

At this time, a star connection includes two neutral points.

Another exemplary relation of connections of each phase coil will be described below with reference to FIGS. 21 and 22. In order to achieve the same power generating characteristics as those in the examples shown in FIGS. 19 and 20, the stator winding of each phase has a wire size doubling a cross-sectional area and divides the number of turns of the annular coil into half.

Figure 21:
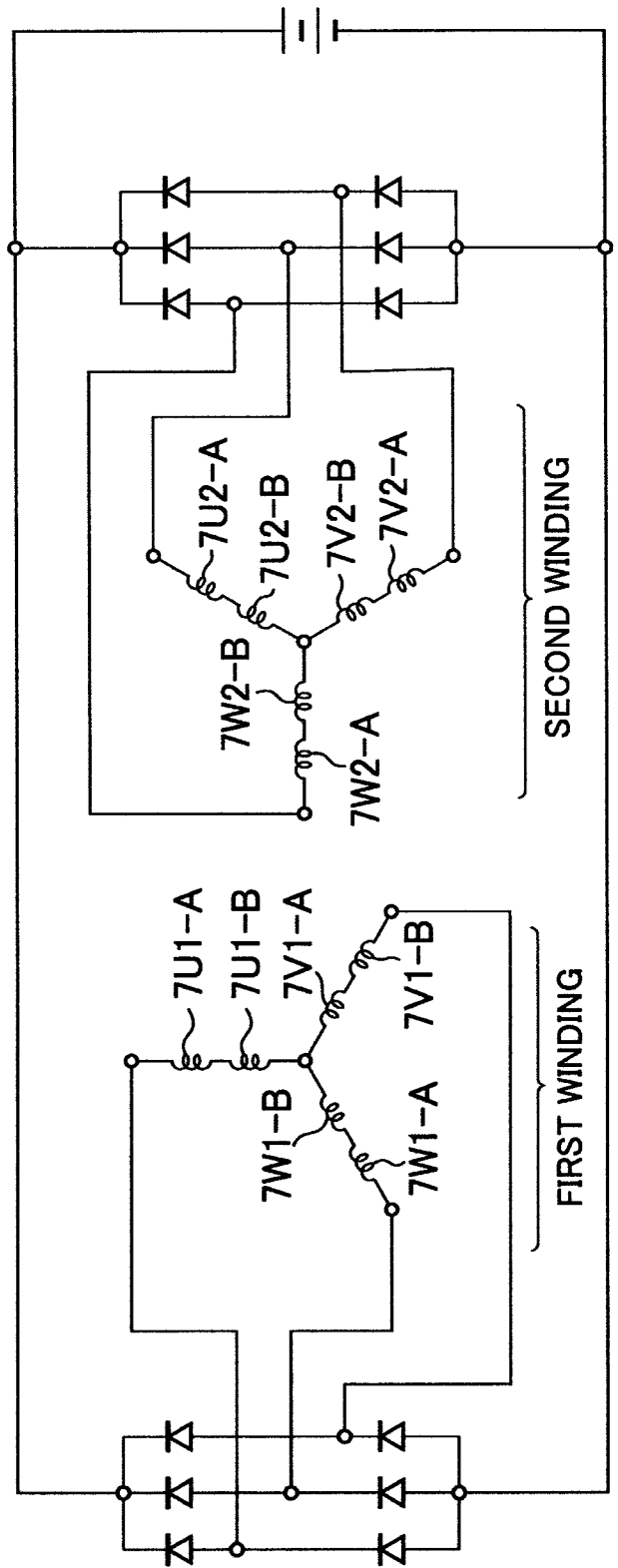
FIG. 21 is a connection diagram showing the stator of the rotating electric machine according to the fifth embodiment, wound by fractional-pitch winding.

In this case, referring to FIG. 21, in the first winding, in a star connection, the U1-phase coil connects 7U1-A and 7U1-B in series with each other. The V1-phase coil connects 7V1-A and 7V1-B in series with each other. In addition, the W1-phase coil connects 7W1-A and 7W1-B in series with each other. Each of these phase coils is then connected with each other in a star connection. In the second winding, too, the U2-phase coil connects 7U2-A and 7U2-B in series with each other. The V2-phase coil connects 7V2-A and 7V2-B in series with each other. In addition, the W2-phase coil connects 7W-A and 7W2-B in series with each other. Each of these phase coils is then connected with each other in a star connection.

Figure 22:
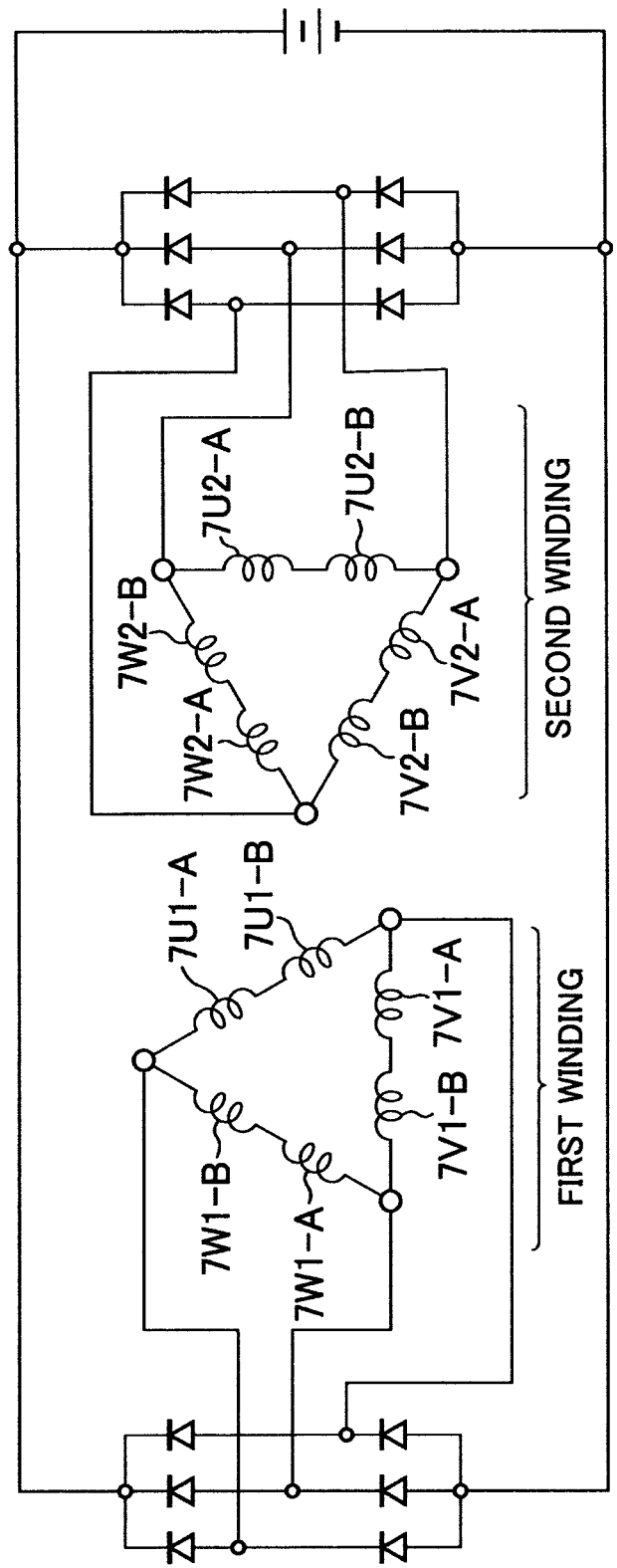
FIG. 22 is a connection diagram showing the stator of the rotating electric machine according to the fifth embodiment, wound by fractional-pitch winding.

Referring to FIG. 22, in the first winding, in a delta connection, the U1-phase coil connects 7U1-A and 7U1-B in series with each other. The V1-phase coil connects 7V1-A and 7V1-B in series with each other. In addition, the W1-phase coil connects 7W1-A and 7W1-B in series with each other. Each of these phase coils is then connected with each other in a delta connection. In the second winding, too, the U2-phase coil connects 7U2-A and 7U2-B in series with each other. The V2-phase coil connects 7V2-A and 7V2-B in series with each other. In addition, the W2-phase coil connects 7W-A and 7W2-B in series with each other. Each of these phase coils is then connected with each other in a delta connection.

In the example shown in FIG. 17, of the 24 leads 71, one each (star connection) or two each (delta connection) are grouped into a set to form six sets in total.

At this time, a star connection includes six nodes connected in series with two neutral points, in addition to the leads.

As described heretofore, in this embodiment, the leakage inductance is equal among different phases, inductance of each phase is equalized, and generated currents among different phases are balanced, so that a rotating electric machine offering a high output and high efficiency can be obtained.

Arrangements of a rotating electric machine according to a sixth embodiment will be described below with reference to FIG. 23. General arrangements of the rotating electric machine according to this embodiment are the same as those shown in FIG. 1. Arrangements of a stator of the rotating electric machine according to this embodiment are the same as those shown in FIG. 17.

Figure 23:
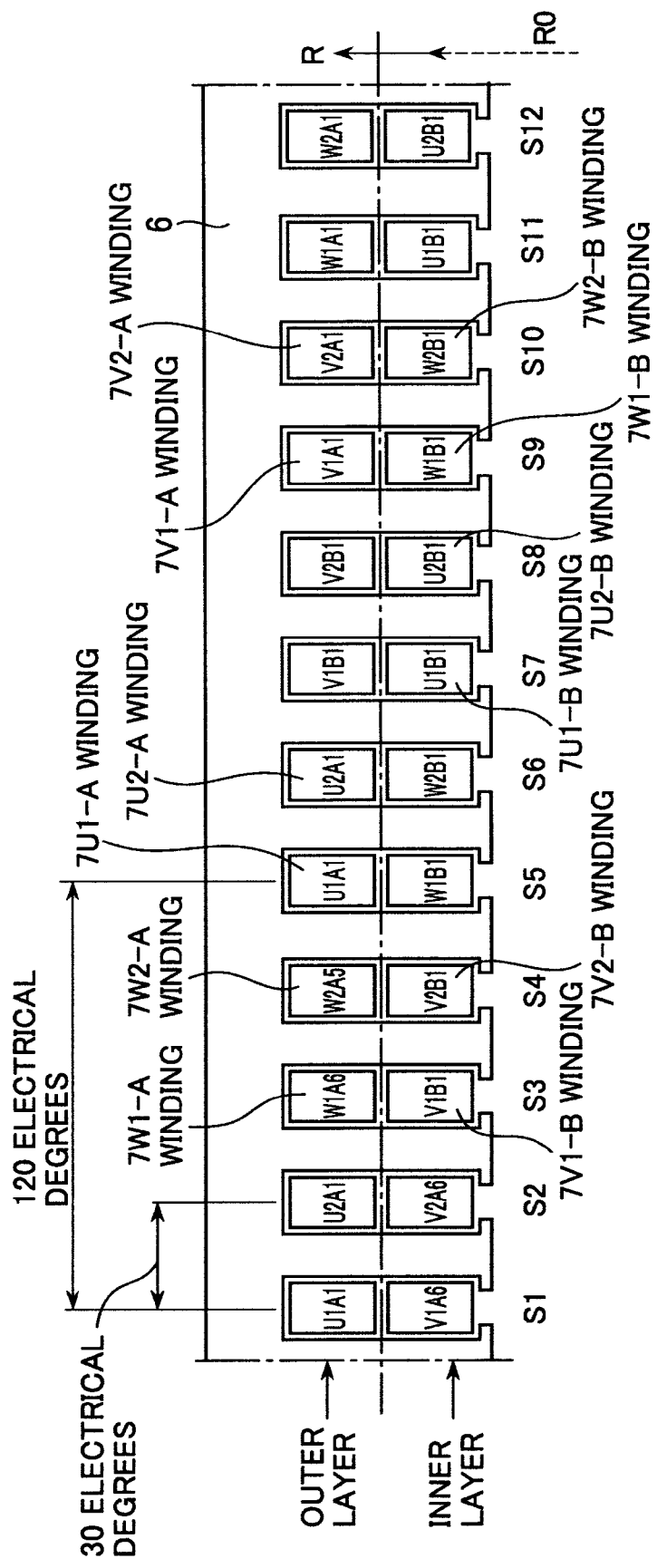
FIG. 23 is an arrangement view showing coils of different phases in slots of a stator of a rotating electric machine according to a sixth embodiment wound by fractional-pitch winding.

FIG. 23 is an arrangement view showing coils of different phases in slots of the stator of the rotating electric machine according to the sixth embodiment wound by the fractional-pitch winding. Like or corresponding parts are identified by the same reference numerals as those used in FIG. 5.

Each of the first to fourth embodiments is concerned with a single three-phase winding. The embodiment shown in FIG. 23 is concerned with two three-phase windings including the stator core having the number of slots twice as many, each of the windings being 30 electrical degrees out of phase from each other. In this example, the number of slots is 72. The configuration having two three-phase windings reduces both magnetic noise and ripple voltage.

The stator core has 72 slots. At this time, the front-side claw-shaped magnetic pole 11 of the rotor shown in FIG. 1 has six claw portions and the rear-side claw-shaped magnetic pole 12 has also six claw portions. Specifically, the rotor has 12 poles.

FIG. 23 shows arrangements of coils in different phases. The stator winding 7 includes two three-phase windings. A first three-phase winding includes a U1-phase, a V1-phase, and a W1-phase and a second three-phase winding includes a U2-phase, a V2-phase, and a W2-phase. The U1-phase and the U2-phase are 30 electrical degrees out of phase from each other. The V1-phase and the V2-phase, and the W1-phase and the W2-phase, are 30 electrical degrees out of phase from each other, respectively.

The U1-phase winding of the stator winding 7 is divided into two windings, 7U1-A and 7U1-B. Each of the U-phase windings 7U1-A and 7U1-B includes a plurality of annularly wound and formed coils connected with jumpers at a pitch of 360 electrical degrees. With the 12-pole three-phase winding here exemplified, the number of annular coils is six and the six annular coils are continuously connected together by the jumpers. Winding configuration is as shown in FIG. 15 that represents the fourth embodiment.

Referring to FIG. 23, the U1-phase windings 7U1-A and 7U1-B have an annular coil pitch at 360 electrical degrees that is equal to the magnetic pole pitch and incorporates the fractional-pitch winding for the winding pitch of the annular coil at 120 electrical degrees.

In addition, 7U1-A and 7U1-B are inserted in slots with 180 electrical degrees out of phase from each other to form the stator winding.

Similarly to the U1-phase stator winding, a V1-phase stator winding, a W1-phase stator winding, a U2-phase stator winding, a V2-phase stator winding, and a W2-phase stator winding are divided into V1-phase windings 7V1-A and 7V1-B, W1-phase stator windings 7W1-A and 7W1-B, U2-phase stator windings 7U2-A and 7U2-B, V2-phase windings 7V2-A and 7V2-B, and W2-phase stator windings 7W2-A and 7W2-B, respectively.

First three-phase windings include the U1-phase windings 7U1-A and 7U1-B, the V1-phase windings 7V1-A and 7V1-B, and the W1-phase windings 7W1-A and 7W1-B. Second three-phase windings include the U2-phase windings 7U2-A and 7U2-B, the V2-phase windings 7V2-A and 7V2-B, and the W2-phase windings 7W2-A and 7W2-B.

Each of the stator windings 7 is inserted in the slot in sequence in the following order, specifically, as shown in FIG. 18, the U1-phase winding 7U1-A, the U2-phase winding 7U2-A, the V1-phase winding 7V1-A, the V2-phase winding 7V2-A, the W1-phase winding 7W1-A, the W2-phase winding 7W2-A, the W1-phase winding 7W1-B, the W2-phase winding 7W2-B, the V1-phase winding 7V1-B, the V2-phase winding 7V2-B, the U1-phase winding 7U1-B, and the U2-phase winding 7U2-B are disposed in sequence in the slot as shown in FIG. 18.

Referring to FIG. 23, coils are disposed in the slot in the stator winding 7 as a two-layer winding in which the coils are radially divided into two groups, a layer on the side of a slot opening portion being an inner layer and a layer on the side of the stator core 6 being an outer layer. It is here noted that the U1-phase winding 7U1-A, the U2-phase winding 7U2-A, the V1-phase winding 7V1-A, the V2-phase winding 7V2-A, the W1-phase winding 7W1-A, and the W2-phase winding 7W2-A are disposed on the outer layer, while the remaining W1-phase winding 7W1-B, the W2-phase winding 7W2-B, the V1-phase winding 7V1-B, the V2-phase winding 7V2-B, the U1-phase winding 7U1-B, and the U2-phase winding 7U2-B are disposed on the inner layer. Then, the phases are connected in parallel with each other, which combines inductance and the inductance of each phase is equalized, so that balance is achieved in generated currents.

Order of insertion of each phase winding will be specifically described below with reference to FIG. 23.

Annular coils designated by an identical reference numeral in FIG. 23, for example, two coils designated by U1A1 of the U1-phase stator windings 7U1-A indicate the annularly formed coils. The annularly formed coil includes two linear slot inserting portions and two coil end portions, each connecting ends of the two slot inserting portions. The two U1-phase annular coils U1A1 shown in FIG. 23 represent respective slot inserting portions of one annularly formed coil. The both ends of each of the two slot inserting portions are connected together by the respective two coil end portions in portions outside respective ends of the slot. The U1-phase annular coil 7U1-A is inserted in the outer layer of the slot. The slot inserting portions of a U1-phase first annular coil U1A1 are inserted in a first slot S1 and a fifth slot S5 across three slots interposed therebetween. The U1-phase stator winding 7U1-A includes six annular coils disposed at an annular coil pitch of 360 electrical degrees that is equal to the magnetic pole pitch and connected together by jumpers. The U1-phase stator winding 7U1-A incorporates the fractional-pitch winding for the winding pitch of the annular coil at 120 electrical degrees. FIG. 23 shows arrangements for 12 slots (⅙ of the total 72 slots) and the same arrangements are repeated for remaining annular coils.

All U1-phase stator windings 7U1-A are inserted in the slots on the outer layer side.

The U2-phase stator winding 7U2-A will be described below. The U2-phase stator winding 7U2-A is inserted in the outer layer of the slot. The slot inserting portions of a U2-phase first annular coil U2A1 are inserted in a second slot S2 and a sixth slot S6 across three slots interposed therebetween. The U2-phase stator winding 7U2-A includes six annular coils disposed at an annular coil pitch of 360 electrical degrees that doubles the magnetic pole pitch and connected together by jumpers. The U2-phase stator winding 7U2-A incorporates the fractional-pitch winding for the winding pitch of the annular coil at 120 electrical degrees. FIG. 23 shows arrangements for 12 slots (⅙ of the total 72 slots) and the same arrangements are repeated for remaining annular coils.

All U2-phase stator windings 7U2-A are inserted in the slots on the outer layer side.

The V1-phase stator winding 7V1-A will be described below. The slot inserting portions of a V1-phase first annular coil V1A1 are inserted in the outer layer of a ninth slot S9 and the inner layer of a 13th slot (not shown) across three slots interposed therebetween. The V1-phase stator winding 7V1-A includes six annular coils disposed at an annular coil pitch of 360 electrical degrees that doubles the magnetic pole pitch and connected together by jumpers. The V1-phase stator winding 7V1-A incorporates the fractional-pitch winding for the winding pitch of the annular coil at 120 electrical degrees. FIG. 23 shows arrangements for 12 slots (⅙ of the total 72 slots) and the same arrangements are repeated for remaining annular coils.

All V1-phase stator windings 7V1-A are inserted in the slots on the outer and inner layer sides.

The V2-phase stator winding 7V2-A will be described below. The slot inserting portions of a V2-phase first annular coil V2A1 are inserted in the outer layer of a tenth slot S10 and the inner layer of a 14th slot (not shown) across three slots interposed therebetween. The V2-phase stator winding 7V2-A includes six annular coils disposed at an annular coil pitch of 360 electrical degrees that doubles the magnetic pole pitch and connected together by jumpers. The V2-phase stator winding 7V2-A incorporates the fractional-pitch winding for the winding pitch of the annular coil at 120 electrical degrees. FIG. 23 shows arrangements for 12 slots (⅙ of the total 72 slots) and the same arrangements are repeated for remaining annular coils.

All V2-phase stator windings 7V2-A are inserted in the slots on the outer and inner layer sides.

The W1-phase stator winding 7W1-A will be described below. The slot inserting portions of a W1-phase first annular coil W1A1 are inserted in the outer layers of an 11th slot S11 and of a 15th slot (not shown) across three slots interposed therebetween. The W1-phase stator winding 7W1-A includes six annular coils disposed at an annular coil pitch of 360 electrical degrees that doubles the magnetic pole pitch and connected together by jumpers. The W1-phase stator winding 7W1-A incorporates the fractional-pitch winding for the winding pitch of the annular coil at 120 electrical degrees.

Similarly, a W1-phase sixth annular coil W1A6 is inserted in the outer layer of a third slot S3. FIG. 23 shows arrangements for 12 slots (⅙ of the total 72 slots) and the same arrangements are repeated for remaining annular coils.

All W1-phase stator windings 7W1-A are inserted in the slots on the outer layer side.

The W2-phase stator winding 7W2-A will be described below. The slot inserting portions of a W2-phase first annular coil W2A1 are inserted in the outer layers of a 12th slot S12 and of a 16th slot (not shown) across three slots interposed therebetween. The W2-phase stator winding 7W2-A includes six annular coils disposed at an annular coil pitch of 360 electrical degrees that doubles the magnetic pole pitch and connected together by jumpers. The W2-phase stator winding 7W2-A incorporates the fractional-pitch winding for the winding pitch of the annular coil at 120 electrical degrees.

Similarly, a W12-phase sixth annular coil W2A6 is inserted in the outer layer of a fourth slot S4. FIG. 23 shows arrangements for 12 slots (⅙ of the total 72 slots) and the same arrangements are repeated for remaining annular coils.

All W2-phase stator windings 7W2-A are inserted in the slots on the outer layer side.

The W1-phase stator winding 7W1-B will be described below. The slot inserting portions of a W1-phase first annular coil W1B1 are inserted in the inner layers of the fifth slot S5 and of the ninth slot S9 across three slots interposed therebetween. The W1-phase stator winding 7W1-B includes six annular coils disposed at an annular coil pitch of 360 electrical degrees that doubles the magnetic pole pitch and connected together by jumpers. The W1-phase stator winding 7W1-B incorporates the fractional-pitch winding for the winding pitch of the annular coil at 120 electrical degrees. FIG. 23 shows arrangements for 12 slots (⅙ of the total 72 slots) and the same arrangements are repeated for remaining annular coils.

All W1-phase stator windings 7W1-B are inserted in the slots on the inner layer side.

The W2-phase stator winding 7W2-B will be described below. The slot inserting portions of a W2-phase first annular coil W2B1 are inserted in the inner layers of the sixth slot S6 and of the tenth slot S10 across three slots interposed therebetween. The W2-phase stator winding 7W2-B includes six annular coils disposed at an annular coil pitch of 360 electrical degrees that doubles the magnetic pole pitch and connected together by jumpers. The W2-phase stator winding 7W2-B incorporates the fractional-pitch winding for the winding pitch of the annular coil at 120 electrical degrees. FIG. 23 shows arrangements for 12 slots (⅙ of the total 72 slots) and the same arrangements are repeated for remaining annular coils.

All W2-phase stator windings 7W2-B are inserted in the slots on the inner layer side.

The V1-phase stator winding 7V1-B will be described below. The slot inserting portions of a V1-phase first annular coil V1B1 are inserted in the inner layer of the third slot S3 and the outer layer of a seventh slot S7 across three slots interposed therebetween. The V1-phase stator winding 7V1-B includes six annular coils disposed at an annular coil pitch of 360 electrical degrees that doubles the magnetic pole pitch and connected together by jumpers. The V1-phase stator winding 7V1-B incorporates the fractional-pitch winding for the winding pitch of the annular coil at 120 electrical degrees. FIG. 23 shows arrangements for 12 slots (⅙ of the total 72 slots) and the same arrangements are repeated for remaining annular coils.

All V1-phase stator windings 7V1-B are inserted in the slots on the outer and inner layer sides.

The V2-phase stator winding 7V2-B will be described below. The slot inserting portions of a V2-phase first annular coil V2B1 are inserted in the inner layer of the fourth slot S4 and the outer layer of an eighth slot S8 across three slots interposed therebetween. The V2-phase stator winding 7V2-B includes six annular coils disposed at an annular coil pitch of 360 electrical degrees that doubles the magnetic pole pitch and connected together by jumpers. The V2-phase stator winding 7V2-B incorporates the fractional-pitch winding for the winding pitch of the annular coil at 120 electrical degrees. FIG. 23 shows arrangements for 12 slots (⅙ of the total 72 slots) and the same arrangements are repeated for remaining annular coils.

All V2-phase stator windings 7V2-B are inserted in the slots on the outer and inner layer sides.

The U1-phase stator winding 7U1-B will be described below. The U1-phase stator winding 7U1-B is inserted in the inner layer of the slot. The slot inserting portions of a U1-phase first annular coil U1B1 are inserted in the seventh slot S7 and the 11th slot S11 across three slots interposed therebetween. The U1-phase stator winding 7U1-B includes six annular coils disposed at an annular coil pitch of 360 electrical degrees that doubles the magnetic pole pitch and connected together by jumpers. The U1-phase stator winding 7U1-B incorporates the fractional-pitch winding for the winding pitch of the annular coil at 120 electrical degrees. FIG. 23 shows arrangements for 12 slots (⅙ of the total 72 slots) and the same arrangements are repeated for remaining annular coils.

All U1-phase stator windings 7U1-B are inserted in the slots on the inner layer side.

The U2-phase stator winding 7U2-B will be described below. The U2-phase stator winding 7U2-B is inserted in the inner layer of the slot. The slot inserting portions of a U2-phase first annular coil U2B1 are inserted in the eighth slot S8 and the 12th slot S12 across three slots interposed therebetween. The U2-phase stator winding 7U2-B includes six annular coils disposed at an annular coil pitch of 360 electrical degrees that doubles the magnetic pole pitch and connected together by jumpers. The U2-phase stator winding 7U2-B incorporates the fractional-pitch winding for the winding pitch of the annular coil at 120 electrical degrees. FIG. 23 shows arrangements for 12 slots (⅙ of the total 72 slots) and the same arrangements are repeated for remaining annular coils.

All U2-phase stator windings 7U2-B are inserted in the slots on the inner layer side.

For example, let R0 be a distance between the center of the rotor and a central position of the coil of the inner layer in the radial direction and let R0+R be a central position of the coils in the outer layer in the radial direction with reference to the radial central position of the inner layer coil.

In the U1-phase coils, the U1-phase coils 7U1-A have one annular coil inserted in the outer layer in the range of 12 slots shown in FIG. 23, so that the radial position is represented by 2R0+2R. The U1-phase coils 7U1-B have one annular coil inserted in the inner layer in the range of 12 slots shown in FIG. 23, so that the radial position is represented by 2R0. Therefore, in the U1-phase coils as a whole, the U1-phase coils 7U1-A and the U1-phase coils 7U1-B are added up to be represented by 4R0+2R (=2R0+2R+2R0).

In the U2-phase coils, the U2-phase coils 7U2-A have one annular coil inserted in the outer layer in the range of 12 slots shown in FIG. 23, so that the radial position is represented by 2R0+2R. The U2-phase coils 7U2-B have one annular coil inserted in the inner layer in the range of 12 slots shown in FIG. 23, so that the radial position is represented by 2R0. Therefore, in the U2-phase coils as a whole, the U2-phase coils 7U2-A and the U2-phase coils 7U2-B are added up to be represented by 4R0+2R (=2R0+2R+2R0).

In the V1-phase coils, the V1-phase coils 7V1-A have one annular coil inserted in the outer and inner layers in the range of 12 slots shown in FIG. 23, so that the radial position is represented by 2R0+R (=R0+R+R0). The V1-phase coils 7V1-B have one annular coil inserted in the outer and inner layers in the range of 12 slots shown in FIG. 23, so that the radial position is represented by 2R0+R (=R0+R+R0). Therefore, in the V1-phase coils as a whole, the V1-phase coils 7V1-A and the V1-phase coils 7V1-B are added up to be represented by 4R0+2R (=2R0+R+2R0+R).

In the V2-phase coils, the V2-phase coils 7V2-A have one annular coil inserted in the outer and inner layers in the range of 12 slots shown in FIG. 23, so that the radial position is represented by 2R0+R (=R0+R+R0). The V2-phase coils 7V2-B have one annular coil inserted in the outer and inner layers in the range of 12 slots shown in FIG. 23, so that the radial position is represented by 2R0+R (=R0+R+R0). Therefore, in the V2-phase coils as a whole, the V2-phase coils 7V2-A and the V2-phase coils 7V2-B are added up to be represented by 4R0+2R (=2R0+R+2R0+R).

In the W1-phase coils, the W1-phase coils 7W1-A have one annular coil inserted in the outer layer in the range of 12 slots shown in FIG. 23, so that the radial position is represented by 2R0+2R. The W1-phase coils 7W1-B have one annular coil inserted in the inner layer in the range of 12 slots shown in FIG. 23, so that the radial position is represented by 2R0. Therefore, in the W1-phase coils as a whole, the W1-phase coils 7W1-A and the W1-phase coils 7W1-B are added up to be represented by 4R0+2R (=2R0+2R+2R0).

In the W2-phase coils, the W2-phase coils 7W2-A have one annular coil inserted in the outer layer in the range of 12 slots shown in FIG. 23, so that the radial position is represented by 2R0+2R. The W2-phase coils 7W2-B have one annular coil inserted in the inner layer in the range of 12 slots shown in FIG. 23, so that the radial position is represented by 2R0. Therefore, in the W2-phase coils as a whole, the W2-phase coils 7W2-A and the W2-phase coils 7W2-B are added up to be represented by 4R0+2R (=2R0+2R+2R0).

The result of the addition of the radial distances of coils in each phase disposed in the slots for the range of 12 slots is 4R0+2R, the same for all stator windings of the U1-phase, the V1-phase, the W1-phase, the U2-phase, the V2-phase, and the W2-phase.

Inductance of the stator windings of the U1-phase, the V1-phase, the W1-phase, the U2-phase, the V2-phase, and the W2-phase is therefore the same.

The stator windings are divided as follows. Specifically, the stator winding of each phase has a wire size half the cross-sectional area and doubles the number of turns of the annular coil. The same power generating characteristics can be obtained even by connecting the stator windings in parallel with each other after the stator core has been installed, which equalizes inductance of each phase.

As described above, in this embodiment, the balance in inductance among different phases results in the same current being generated by the different phases, so that amounts of heat generated by the stator windings and the diode balance. Then, for example, increased magnetic noise due to increased temperatures of the coils and the diode or an increased magnetic exciting force enhance quality and characteristics.

Arrangements of a rotating electric machine according to a seventh embodiment will be described below with reference to FIG. 24. General arrangements of the rotating electric machine according to this embodiment are the same as those shown in FIG. 1.

Figure 24:
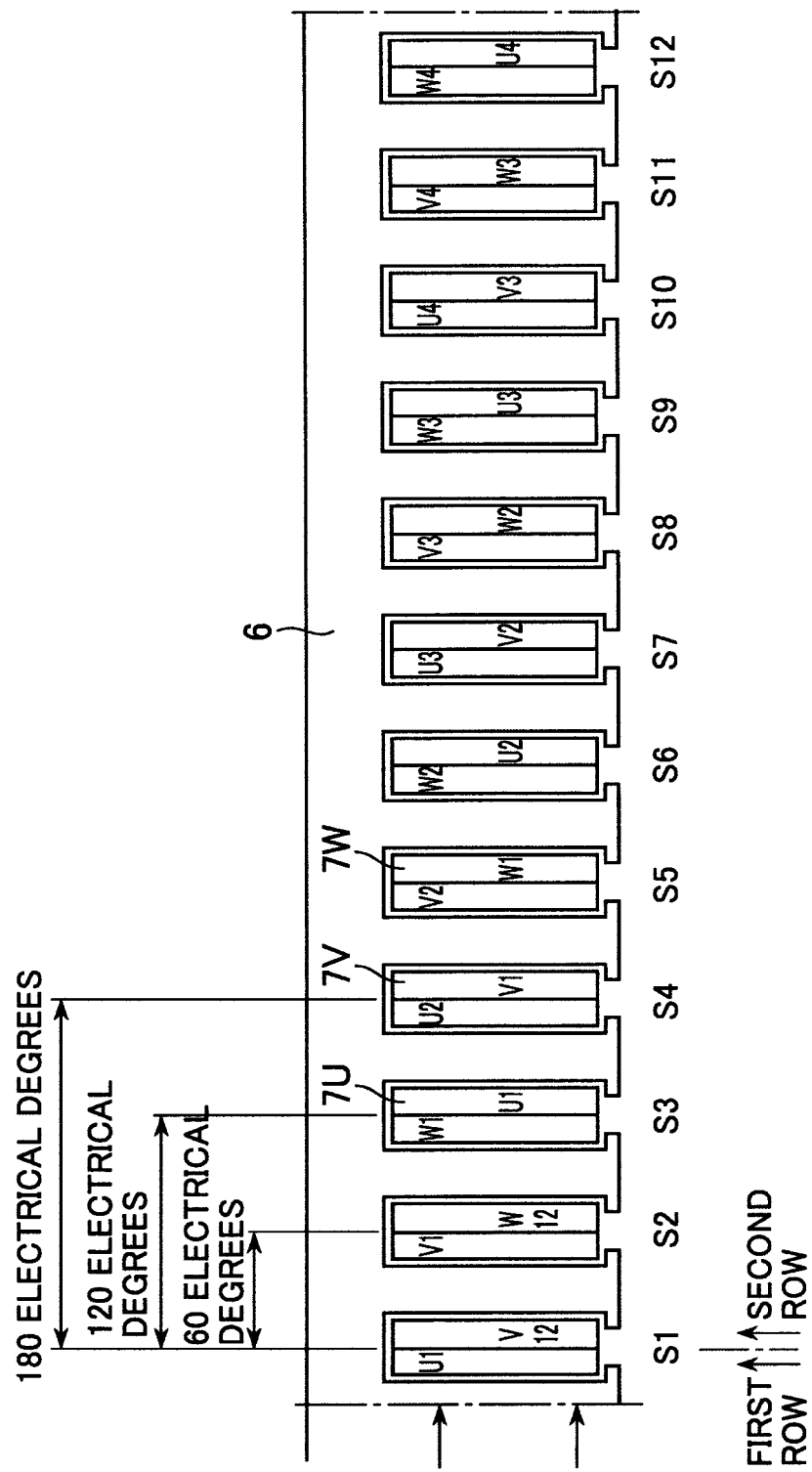
FIG. 24 is an arrangement view showing coils of different phases in slots of a stator of a rotating electric machine according to a seventh embodiment wound by fractional-pitch winding.

FIG. 24 is an arrangement view showing coils of different phases in slots of a stator of the rotating electric machine according to the seventh embodiment wound by the fractional-pitch winding. Like or corresponding parts are identified by the same reference numerals as those used in FIG. 5.

Coils of each phase are divided within the same phase in each of the first to sixth embodiments. In this embodiment, equalization of inductance is achieved without dividing coils within the phase.

In this embodiment, the stator winding of each phase is configured as shown in FIG. 2. Specifically, a stator winding 7 includes a plurality of annularly wound and formed coils connected together with jumpers. With a 12-pole three-phase winding here exemplified, the number of annular coils is 12 and the 12 annular coils are continuously connected together by the jumpers. The number of turns of the annular coil is, for example, 8T.

It is noted that the number of slots in the stator core is 36. At this time, the front-side claw-shaped magnetic pole 11 of the rotor shown in FIG. 1 has six claw portions and the rear-side claw-shaped magnetic pole 12 also has six claw portions. Specifically, the rotor has 12 poles.

Referring to FIG. 2, for a U-phase stator winding 7U, the annular coils are disposed at a pitch of 180 electrical degrees that equals the magnetic pole pitch and the winding pitch of the annular coils is the fractional-pitch winding.

The same configuration applies also to a V-phase stator winding and a W-phase stator winding.

The formed stator winding 7 has the U-phase stator winding 7U, a V-phase stator winding 7V, and a W-phase stator winding 7W inserted in sequence in respective slots and disposed, as shown in FIG. 24, in sequence in the respective slots. Assuming that the number of poles of the rotor is 12 and the number of slots in the stator is 36, a pitch between a first slot S1 and a fourth slot S4 is 180 electrical degrees.

The stator winding 7 has a double-circumferential-layer winding arrangement in which the winding is divided into two circumferential layers of the slot, one being a first row and the other being a second row.

The U-phase stator winding 7U will be described below. The slot inserting portions of a first annular coil U1 are inserted in a first row of a first slot S1 and a second row of a third slot S3 across one slot S2 interposed therebetween. A second U-phase annular coil U2 is inserted in a first row of a fourth slot S4 adjacent the slot S3 in which the first U-phase annular coil U1 is inserted and in a second row of a sixth slot S6 across one slot S5 interposed therebetween. It is noted that the first U-phase annular coil U1 and the second U-phase annular coil U2 are connected together by a jumper as shown in FIG. 2. Specifically, the U-phase annular coil 7U has an annular coil pitch at 180 electrical degrees that is equal to the magnetic pole pitch and incorporates the fractional-pitch winding for the winding pitch of the annular coil at 120 electrical degrees.

Similarly, a third U-phase annular coil U3 is inserted in a first row of a seventh slot S7 and a second row of a ninth slot S9. A fourth U-phase annular coil U4 is inserted in a first row of a tenth slot S10 and a second row of a 12th slot S12. Though FIG. 4 shows arrangements for 12 slots (⅓ of the total 36 slots), the same arrangements are repeated for remaining fifth to 12th annular coils.

The V-phase stator winding 7V will be described below. The slot inserting portions of a first annular coil V1 are inserted in a first row of a second slot S2 and a second row of the fourth slot S4 across one slot S3 interposed therebetween. A second V-phase annular coil V2 is inserted in a first row of a fifth slot S4 adjacent the slot S4 in which the first V-phase annular coil V1 is inserted and in a second row of the seventh slot S7 across one slot S6 interposed therebetween. Similarly, a third V-phase annular coil V3 is inserted in a first row of an eighth slot S8 and a second row of the tenth slot S10. A fourth V-phase annular coil V4 is inserted in a first row of an 11th slot S11 and a second row of a 13th slot not shown. Additionally, a 12th V-phase annular coil V12 is inserted in a second row of the first slot S1. Though FIG. 4 shows arrangements for 12 slots (⅓ of the total 36 slots), the same arrangements are repeated for remaining fifth to 12th annular coils.

The W-phase stator winding 7W will be described below. The slot inserting portions of a first annular coil W1 are inserted in a first row of the third slot S3 and a second row of the fifth slot S5 across one slot S4 interposed therebetween. A second W-phase annular coil W2 is inserted in a first row of the sixth slot S6 adjacent the slot S5 in which the first W-phase annular coil W1 is inserted and in a second row of the eighth slot S8 across one slot S7 interposed therebetween. Similarly, a third W-phase annular coil W3 is inserted in a first row of the ninth slot S9 and a second row of the 11th slot S11. A fourth W-phase annular coil W4 is inserted in a first row of the 12th slot S12 and a second row of a 14th slot not shown. Additionally, a 12th W-phase annular coil W12 is inserted in a second row of the second slot S2. Though FIG. 4 shows arrangements for 12 slots (⅓ of the total 36 slots), the same arrangements are repeated for remaining fifth to 12th annular coils.

The foregoing coil arrangements equalize leakage inductance of each phase and inductance of each phase, thereby balancing current generated by the different phases.

Arrangements of a rotating electric machine according to an eighth embodiment will be described below with reference to FIG. 25. General arrangements of the rotating electric machine according to this embodiment are the same as those shown in FIG. 1.

Figure 25:
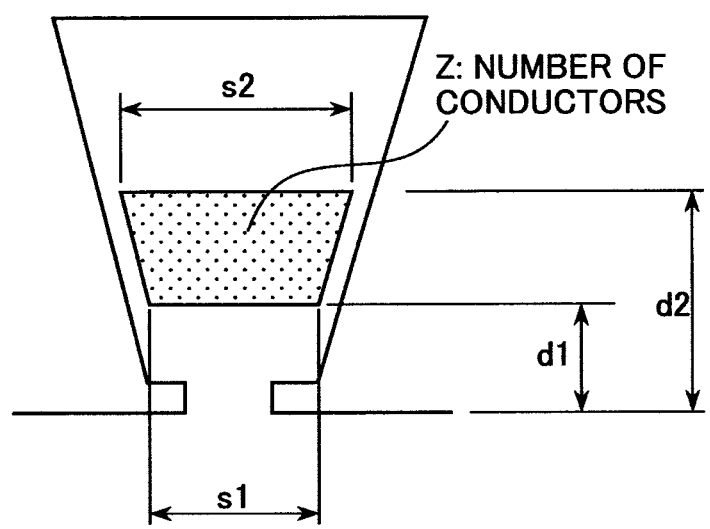
FIG. 25 is a drawing illustrating inductance of a coil in a slot of a stator of a rotating electric machine according to an eighth embodiment.

FIG. 25 is a drawing illustrating inductance of a coil in a slot of a stator of the rotating electric machine according to the eighth embodiment.

In each of the above-described embodiments, the slot in the stator core has a width that remains the same from the inner peripheral side to the outer peripheral side and the stator winding has the same wire diameter and the same number of turns of the coil, evenly divided in each phase. For example, in the example shown in FIG. 8, the second U-phase first annular coil UB1 disposed in the first layer and the first U-phase first annular coil UA1 disposed in the fourth layer are the same winding having the same cross-sectional area. However, when a single stator winding is to be divided into two, one for the inner layer and the other for the outer layer, the winding is not necessarily divided evenly. This will be described below.

If the stator winding is disposed in the slot as shown in FIG. 25, leakage inductance in the slot is directly proportional to the square of the number of conductors Z and heights d1, d2 in the radial direction of the slot and inversely proportional to widths s1, s2 in the circumferential direction. Using this relationship, a coefficient K that represents a relationship between the disposition of the slot and the inductance is given by the following expression:

$$K=Z^2 \times ((d1/s1)+(d2/s2))$$

Let Ku, Kv, and Kw be the coefficient K of each of U-phase, V-phase, and W-phase, respectively. Inductance of each phase equals to each other if the coil is disposed in the slot such that the following expression holds for results of calculations of the leakage inductance of different phases.

$$Ku=Kv=Kw$$

Specifically, in the example shown in FIG. 8, each phase divided into four in the radial direction is divided into coil A and coil B. Let Ku be a coefficient Kua calculated with the U-phase coil A added to a coefficient Kub calculated with the U-phase coil B. Then, obtain the coefficients Kv and Kw for the V-phase and the W-phase in the similar manner. If each phase is disposed in the slot so that Ku=Kv=Kw holds, inductance of each phase can then be equalized.

The first through eighth embodiments have been described for the stator having stator windings wound at a winding pitch of ⅘ (120 electrical degrees). The descriptions hold also of a stator arrangement having stator windings wound at a winding pitch of ⅚ (150 electrical degrees) and achieves the same effect.

Each of the foregoing embodiments has been described for a vehicular AC generator as an exemplary rotating electric machine. The embodiments are nonetheless applicable to, for example, a motor outputting a rotational force or a motor generator capable of generating power and driving. For motors, in particular, the embodiments can be applied to a stator for, for example, a drive motor or a motor for driving a pump in a hybrid vehicle or an electric four-wheel-drive vehicle.

DESCRIPTION OF REFERENCE NUMERALS

1: Pulley
2: Shaft
3: Front bearing
4: Rotor
5: Stator
6: Stator core
7: Stator winding
71: Lead
72-a: Coil end on lead side
72-b: Coil end on side opposite lead side
7U: U-phase stator winding
7V: V-phase stator winding
7W: W-phase stator winding
8: Insulating paper
9: Slot wedge
10: Rear bearing
11: Front-side claw magnetic pole
12: Rear-side claw magnetic pole
13: Field winding
14: Slip ring
15: Brush
16: Front fan
17: Rear fan
18: Front bracket
19: Rear bracket
22: Rear cover
20: Rectifying circuit
21: Diode connecting terminal
23: Vehicular AC generator

The invention claimed is:
1. A rotating electric machine comprising:
a stator, the stator including:
an annular stator core having a plurality of slots that open to an inner peripheral surface; and
a stator winding wound via an insulating sheet in the slots, the stator having coils of different phases disposed in the slot; and
a rotor rotatably supported on an inner peripheral side of the stator via a gap, wherein
the stator winding is divided into at least two for each phase in the slot so as to balance inductance;
the stator winding of each phase is divided and inserted evenly in a radial direction or a rotating direction in the slot, the stator winding being disposed such that a value of totaling all distances for each phase, each distance being from a center of the stator core, is identical for all phases; and
the stator winding of each phase has annular coils disposed at a pitch that doubles a magnetic pole pitch, and the number of annular coils is equally divided so as to be ½ of the number of poles, each of the annular coils being inserted in the slot with the magnetic pole pitch out of phase from each other before being combined through a series connection.

2. The rotating electric machine according to claim 1, wherein
the jumpers are evenly disposed at a coil lead side of a coil end of the stator winding and a side opposite the lead.

3. The rotating electric machine according to claim 1, wherein
the jumpers are disposed at a side opposite a lead of a coil end of the stator winding.

4. A rotating electric machine comprising:
a stator, the stator including:
an annular stator core having a plurality of slots that open to an inner peripheral surface; and
a stator winding wound via an insulating sheet in the slots, the stator having coils of different phases disposed in the slot; and
a rotor rotatably supported on an inner peripheral side of the stator via a gap, wherein
the stator winding is divided into at least two for each phase in the slot so as to balance inductance;
the stator winding of each phase is divided and inserted evenly in a radial direction or a rotating direction in the slot, the stator winding being disposed such that a value of totaling all distances for each phase, each distance being from a center of the stator core, is identical for all phases;
the stator winding of each phase includes first and second stator windings;
each of the first and the second stator windings includes a plurality of annular coils connected together with jumpers;
the annular coil incorporates fractional-pitch winding in which the annular coil is inserted in respective slots across a plurality of teeth of the stator core at a pitch narrower than the magnetic pole pitch of the rotor;
the annular coils have a pitch equal to the magnetic pole pitch;
the slots house stator windings of four different layers disposed therein with the stator windings divided into four in a radial direction;
the slots house the first and the second stator windings of an identical phase disposed therein;
an outermost layer that is a fourth layer from an innermost layer of the slots houses the first stator winding of a first phase disposed therein;
the outermost layer and a third layer that is a third one from the innermost layer of the slots house the first stator winding of a second phase disposed therein;
the third layer of the slots houses the first stator winding of a third phase disposed therein;
a second layer that is a second one from the innermost layer of the slots houses the second stator winding of a third phase disposed therein;
the second layer and the innermost layer of the slots house the second stator winding of a second phase disposed therein; and
the innermost layer of the slots houses the second stator winding of a first phase.

5. The rotating electric machine comprising:
a stator, the stator including:
an annular stator core having a plurality of slots that open to an inner peripheral surface; and
a stator winding wound via an insulating sheet in the slots, the stator having coils of different phases disposed in the slot; and
a rotor rotatably supported on an inner peripheral side of the stator via a gap, wherein
the stator winding is divided into at least two for each phase in the slot so as to balance inductance;
the stator winding of each phase is divided and inserted evenly in a radial direction or a rotating direction in the slot, the stator winding being disposed such that a value of totaling all distances for each phase, each distance being from a center of the stator core, is identical for all phases;
the stator winding of each phase includes first and second stator windings;
each of the first and the second stator windings includes a plurality of annular coils connected together with jumpers;
the annular coil incorporates fractional-pitch winding in which the annular coil is inserted in respective slots across a plurality of teeth of the stator core at a pitch narrower than the magnetic pole pitch of the rotor;
the annular coils have a pitch equal to the magnetic pole pitch;
the slots house stator windings of two different layers disposed therein with the stator windings divided into two in a radial direction;
the slots house the first and the second stator windings out of phase by the magnetic pole pitch disposed therein;
an outer layer of the slots houses the first stator winding of a first phase disposed therein;
the outer layer and an inner layer of the slots house the first stator winding of a second phase disposed therein;
the outer layer of the slots houses the first stator winding of a third phase disposed therein;
the inner layer of the slots houses the second stator winding of a third phase disposed therein;
the outer layer and the inner layer of the slots house the second stator winding of a second phase disposed therein; and
the inner layer of the slots houses the second stator winding of a first phase.

6. A rotating electric machine comprising:
a stator, the stator including:
an annular stator core having a plurality of slots that open to an inner peripheral surface; and
a stator winding wound via an insulating sheet in the slots, the stator having coils of different phases disposed in the slot; and
a rotor rotatably supported on an inner peripheral side of the stator via a gap, wherein
the stator winding is divided into at least two for each phase in the slot so as to balance inductance;
the stator winding of each phase is divided and inserted evenly in a radial direction or a rotating direction in the slot, the stator winding being disposed such that a value of totaling all distances for each phase, each distance being from a center of the stator core, is identical for all phases;
the stator winding includes two three-phase windings, each including a first three-phase winding and a second three-phase winding;
the first three-phase winding includes stator windings of a first phase, a second phase, and a third phase;
the second three-phase winding includes stator windings of a fourth phase, a fifth phase, and a sixth phase;
the stator winding of each phase includes first and second stator windings;
each of the first and the second stator windings includes a plurality of annular coils connected together with jumpers;

the annular coil incorporates fractional-pitch winding in which the annular coil is inserted in respective slots across a plurality of teeth of the stator core at a pitch narrower than the magnetic pole pitch of the rotor;
the annular coils have a pitch equal to the magnetic pole pitch;
the slots house stator windings of four different layers disposed therein with the stator windings divided into four in a radial direction;
the slots house the stator windings of the first and the fourth phases disposed therein with a ⅙ magnetic pole pitch out of phase from each other;
the slots house the stator windings of the second and the fifth phases disposed therein with a ⅙ magnetic pole pitch out of phase from each other;
the slots house the stator windings of the third and the sixth phases disposed therein with a ⅙ magnetic pole pitch out of phase from each other;
the slots house the first and the second stator windings of an identical phase disposed therein;
an outermost layer that is a fourth layer from an innermost layer of the slots houses the first stator winding of the first phase and the first stator winding of the fourth phase disposed therein;
the outermost layer and a third layer that is a third one from the innermost layer of the slots house the first stator winding of the second phase and the first stator winding of the fifth phase disposed therein;
the third layer of the slots houses the first stator winding of the third phase and the first stator winding of the sixth phase disposed therein;
a second layer that is a second one from the innermost layer of the slots houses the second stator winding of the third phase and the second stator winding of the sixth phase disposed therein;
the second layer and the innermost layer of the slots house the second stator winding of the second phase and the second stator winding of the fifth phase disposed therein; and
the innermost layer of the slots houses the second stator winding of the first phase and the second stator winding of the fourth phase.

7. A rotating electric machine comprising:
a stator, the stator including:
  an annular stator core having a plurality of slots that open to an inner peripheral surface; and
  a stator winding wound via an insulating sheet in the slots, the stator having coils of different phases disposed in the slot; and
a rotor rotatably supported on an inner peripheral side of the stator via a gap, wherein
the stator winding is divided into at least two for each phase in the slot so as to balance inductance;
the stator winding of each phase is divided and inserted evenly in a radial direction or a rotating direction in the slot, the stator winding being disposed such that a value of totaling all distances for each phase, each distance being from a center of the stator core, is identical for all phases;
the stator winding includes two three-phase windings, each including a first three-phase winding and a second three-phase winding;
the first three-phase winding includes stator windings of a first phase, a second phase, and a third phase;
the second three-phase winding includes stator windings of a fourth phase, a fifth phase, and a sixth phase;
the stator winding of each phase includes first and second stator windings;
each of the first and the second stator windings includes a plurality of annular coils connected together with jumpers;
the annular coil incorporates fractional-pitch winding in which the annular coil is inserted in respective slots across a plurality of teeth of the stator core at a pitch narrower than the magnetic pole pitch of the rotor;
the annular coils have a pitch that doubles the magnetic pole pitch;
the first stator winding and the second stator winding are disposed in the slots with a magnetic pole pitch out of phase from each other;
the slots house the stator windings of the first and the fourth phases disposed therein with a ⅙ magnetic pole pitch out of phase from each other;
the slots house the stator windings of the second and the fifth phases disposed therein with a ⅙ magnetic pole pitch out of phase from each other;
the slots house the stator windings of the third and the sixth phases disposed therein with a ⅙ magnetic pole pitch out of phase from each other;
the slots house stator windings of two different layers disposed therein with the stator windings divided into two in a radial direction;
an outer layer of the slots houses the first stator winding of the first phase and the first stator winding of the fourth phase disposed therein;
the outer layer and an inner layer of the slots house the first stator winding of the second phase and the first stator winding of the fifth phase disposed therein;
the outer layer of the slots houses the first stator winding of the third phase and the first stator winding of the sixth phase disposed therein;
the inner layer of the slots houses the second stator winding of the third phase and the second stator winding of the sixth phase disposed therein;
the outer layer and the inner layer of the slots house the second stator winding of the second phase and the second stator winding of the fifth phase disposed therein; and
the inner layer of the slots houses the second stator winding of the first phase and the second stator winding of the fourth phase.

8. A rotating electric machine comprising:
a stator, the stator including:
  an annular stator core having a plurality of slots that open to an inner peripheral surface; and
  a stator winding wound via an insulating sheet in the slots, the stator having coils of different phases disposed in the slot; and
a rotor rotatably supported on an inner peripheral side of the stator via a gap, wherein
the stator winding is divided into at least two for each phase in the slot so as to balance inductance;
the stator winding of each phase is divided and inserted evenly in a radial direction or a rotating direction in the slot, the stator winding being disposed such that a value of totaling all distances for each phase, each distance being from a center of the stator core, is identical for all phases;
the stator winding of each phase includes a plurality of annular coils connected together with jumpers;
the annular coil incorporates fractional-pitch winding in which the annular coil is inserted in respective slots across a plurality of teeth of the stator core at a pitch narrower than the magnetic pole pitch of the rotor;

the annular coils have a pitch equal to the magnetic pole pitch;

the slots house stator windings of two different layers disposed therein with the stator windings divided into two in a rotating direction;

the slots house the stator windings of an identical phase disposed therein with the magnetic pole pitch out of phase from each other;

a first row and a second row of the slots house the stator winding of a first phase disposed therein;

the first row and the second row of the slots house the stator winding of a second phase disposed therein; and the first row and the second row of the slots house the stator winding of a third phase disposed therein.

9. A rotating electric machine comprising:

a stator, the stator including:
- an annular stator core having a plurality of slots that open to an inner peripheral surface and;
- a stator winding wound via an insulating sheet in the slots, the stator having coils of different phases disposed in the slot; and a rotor rotatably supported on an inner peripheral side of the stator via a gap, wherein the stator winding is divided into at least two for each phase in the slot so as to balance inductance, the stator winding of each phase is divided and inserted evenly in a radial direction or a rotating direction in the slot, the stator winding being disposed such that a value of totaling all distances for each phase, each distance being from a center of the stator core, is identical for all phases, the stator winding of each phase is divided evenly by a cross-sectional ratio so as to be equal to a strand wire size, and the stator winding of each phase has annular coils disposed at a pitch that doubles a magnetic pole pitch, and the number of annular coils is equally divided so as to be ½ of the number of poles, each of the annular coils being inserted in the slot with the magnetic pole pitch out of phase from each other before being combined through a parallel connection.

* * * * *